US011862878B2

(12) United States Patent
Yoshikawa et al.

(10) Patent No.: US 11,862,878 B2
(45) Date of Patent: Jan. 2, 2024

(54) ANTENNA, ARRAY ANTENNA, RADIO COMMUNICATION MODULE, AND RADIO COMMUNICATION DEVICE

(71) Applicant: KYOCERA CORPORATION, Kyoto (JP)

(72) Inventors: Hiromichi Yoshikawa, Yokohama (JP); Nobuki Hiramatsu, Yokohama (JP); Masamichi Yonehara, Yokohama (JP)

(73) Assignee: KYOCERA CORPORATION, Kyoto (JP)

(*) Notice: Subject to any disclaimer, the term of this patent is extended or adjusted under 35 U.S.C. 154(b) by 404 days.

(21) Appl. No.: 17/290,776

(22) PCT Filed: Oct. 29, 2019

(86) PCT No.: PCT/JP2019/042426
§ 371 (c)(1),
(2) Date: May 3, 2021

(87) PCT Pub. No.: WO2020/090838
PCT Pub. Date: May 7, 2020

(65) Prior Publication Data

US 2021/0384634 A1 Dec. 9, 2021

(30) Foreign Application Priority Data

Nov. 2, 2018 (JP) ................................ 2018-207477
Aug. 14, 2019 (JP) ................................ 2019-148850

(51) Int. Cl.
*H01Q 1/22* (2006.01)
*H01Q 9/16* (2006.01)
(Continued)

(52) U.S. Cl.
CPC ............... *H01Q 9/16* (2013.01); *H01Q 1/243* (2013.01); *H01Q 3/24* (2013.01); *H01Q 9/0407* (2013.01);
(Continued)

(58) Field of Classification Search
CPC ............ H01Q 9/16; H01Q 3/24; H01Q 21/24; H01Q 1/243
(Continued)

(56) References Cited

U.S. PATENT DOCUMENTS 10,741,931 B2 * 8/2020 Howard ............... H01Q 21/065
2008/0204327 A1 8/2008 Lee et al.
(Continued)

FOREIGN PATENT DOCUMENTS

CN 108336491 A 7/2018
JP S5859605 A 4/1983
(Continued)

*Primary Examiner* — Peguy Jean Pierre
(74) *Attorney, Agent, or Firm* — HAUPTMAN HAM, LLP

(57) ABSTRACT

An antenna includes a radiation conductor, a ground conductor, first-fourth feeding lines, a first feeding circuit, and a second feeding circuit. The first feeding line to the fourth feeding line are configured to be electromagnetically connected to the radiation conductor. The first feeding circuit is configured to feed reversed-phased signals, which have mutually opposite phases, to the first feeding line and the third feeding line. The second feeding circuit is configured to feed reversed-phased signals, which have mutually opposite phases, to the second feeding line and the fourth feeding line. The radiation conductor is configured to be excited in a first direction due to the feed from the first feeding line and the third feeding line. The radiation conductor is configured to be excited in a second direction due to the feed from the second feeding line and the fourth feeding line.

20 Claims, 19 Drawing Sheets

(51) Int. Cl.

| | |
|---|---|
| ***H01Q 1/24*** | (2006.01) |
| ***H01Q 3/24*** | (2006.01) |
| ***H01Q 9/04*** | (2006.01) |
| ***H01Q 13/08*** | (2006.01) |
| *H01Q 21/00* | (2006.01) |
| *H01Q 21/06* | (2006.01) |
| *H01Q 21/24* | (2006.01) |

(52) U.S. Cl.
CPC ......... *H01Q 13/08* (2013.01); *H01Q 21/0006* (2013.01); *H01Q 21/06* (2013.01); *H01Q 21/24* (2013.01)

(58) Field of Classification Search
USPC ........................................... 343/700 MS, 702
See application file for complete search history.

(56) References Cited

U.S. PATENT DOCUMENTS

| | | | | |
|---|---|---|---|---|
| 2012/0146869 | A1 | 6/2012 | Holland et al. | |
| 2016/0141748 | A1 | 5/2016 | Tagi et al. | |
| 2016/0181704 | A1 | 6/2016 | Orban et al. | |
| 2019/0157762 | A1 * | 5/2019 | Shibata | H01Q 5/307 |

FOREIGN PATENT DOCUMENTS

| | | | | | |
|---|---|---|---|---|---|
| JP | 2003224416 | A | 8/2003 | | |
| JP | 2007028238 | * | 2/2007 | | H01Q 13/22 |
| JP | 201427416 | A | 2/2014 | | |
| JP | 2016105583 | A | 6/2016 | | |
| JP | 2016115990 | A | 6/2016 | | |

* cited by examiner

ANTENNA, ARRAY ANTENNA, RADIO COMMUNICATION MODULE, AND RADIO COMMUNICATION DEVICE

CROSS-REFERENCE TO RELATED APPLICATION

This application is a National Stage of PCT international application Ser. No. PCT/JP2019/042426 filed on Oct. 29, 2019 which designates the United States, incorporated herein by reference, and which is based upon and claims the benefit of priority from Japanese Patent Application No. 2018-207477 filed on Nov. 2, 2018 and from Japanese Patent Application No. 2019-148850, filed on Aug. 14, 2019, the entire contents of which are incorporated herein by reference.

FIELD

The present disclosure is related to an antenna, an array antenna, a radio communication module, and a radio communication device.

BACKGROUND

If two antennas are moved close to each other, then isolation can no more be secured. In order to secure isolation of antennas, there is a technology for separating two antennas and inserting a structure between them. That technology is disclosed in, for example, Patent Literature 1.

CITATION LIST

Patent Literature

Patent Literature 1: Japanese Patent Application Laid-open No. 2016-105583

SUMMARY

An antenna according to an example of embodiments of the present disclosure include a radiation conductor, a ground conductor, a first feeding line, a second feeding line, a third feeding line, a fourth feeding line, a first feeding circuit, and a second feeding circuit. The first feeding line is configured to be electromagnetically connected to the radiation conductor. The second feeding line is configured to be electromagnetically connected to the radiation conductor. The third feeding line is configured to be electromagnetically connected to the radiation conductor. The fourth feeding line is configured to be electromagnetically connected to the radiation conductor. The first feeding circuit is configured to feed reversed-phased signals, which have mutually opposite phases, to the first feeding line and the third feeding line. The second feeding circuit is configured to feed reversed-phased signals, which have mutually opposite phases, to the second feeding line and the fourth feeding line. The radiation conductor is configured to be excited in a first direction due to feed from the first feeding line and the third feeding line. The radiation conductor is configured to be excited in a second direction due to feed from the second feeding line and the fourth feeding line. When seen from a center of the radiation conductor, the third feeding line is positioned on opposite side of the first feeding line in the first direction. When seen from a center of the radiation conductor, the fourth feeding line is positioned on opposite side of the second feeding line in the second direction.

An array antenna according to an example of embodiments of the present disclosure includes a plurality of antenna elements, each representing the above-described antenna. The plurality of antenna elements are arranged in the first direction.

A radio communication module according to an example of embodiments of the present disclosure includes an antenna element representing the above-described antenna; and a driving circuit. The driving circuit is configured to be connected, directly or indirectly, to the first feeding circuit and the second feeding circuit.

A radio communication module according to an example of embodiments of the present disclosure includes the above-described array antenna; and a driving circuit. The driving circuit is configured to be connected, directly or indirectly, to the first feeding circuit and the second feeding circuit.

A radio communication device according to an example of embodiments of the present disclosure includes the above-described radio communication module; and a battery. The battery is configured to drive the driving circuit.

DESCRIPTION OF EMBODIMENTS

Figure 1:
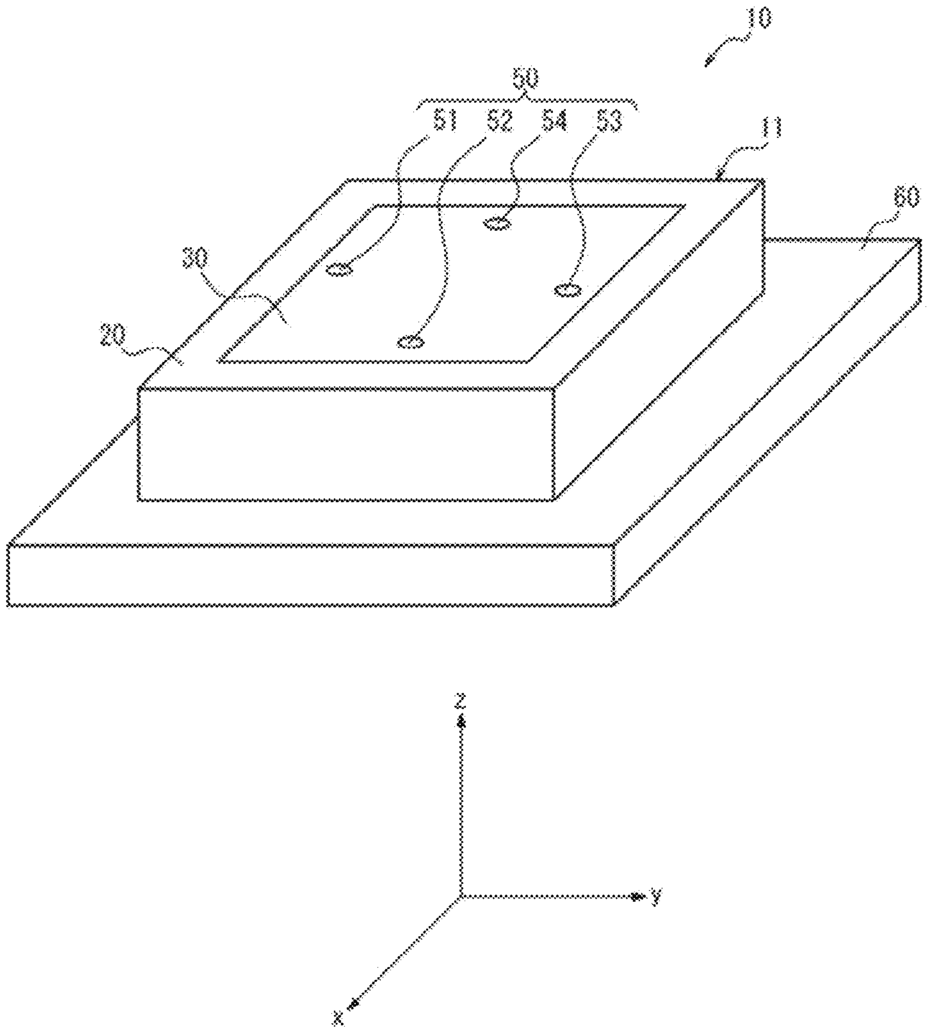
FIG. 1 is a perspective view of an antenna according to an embodiment.

In the conventional technology, as a result of inserting a structure, the antenna configuration increases in size.

The present disclosure is related to providing an antenna, an array antenna, a radio communication module, and a radio communication device of a new type.

According to the present disclosure, an antenna, an array antenna, a radio communication module, and a radio communication device of a new type can be provided.

A plurality of embodiments of the present disclosure are described below. In the drawings, identical constituent elements are referred to by the same reference numerals.

Figure 2:
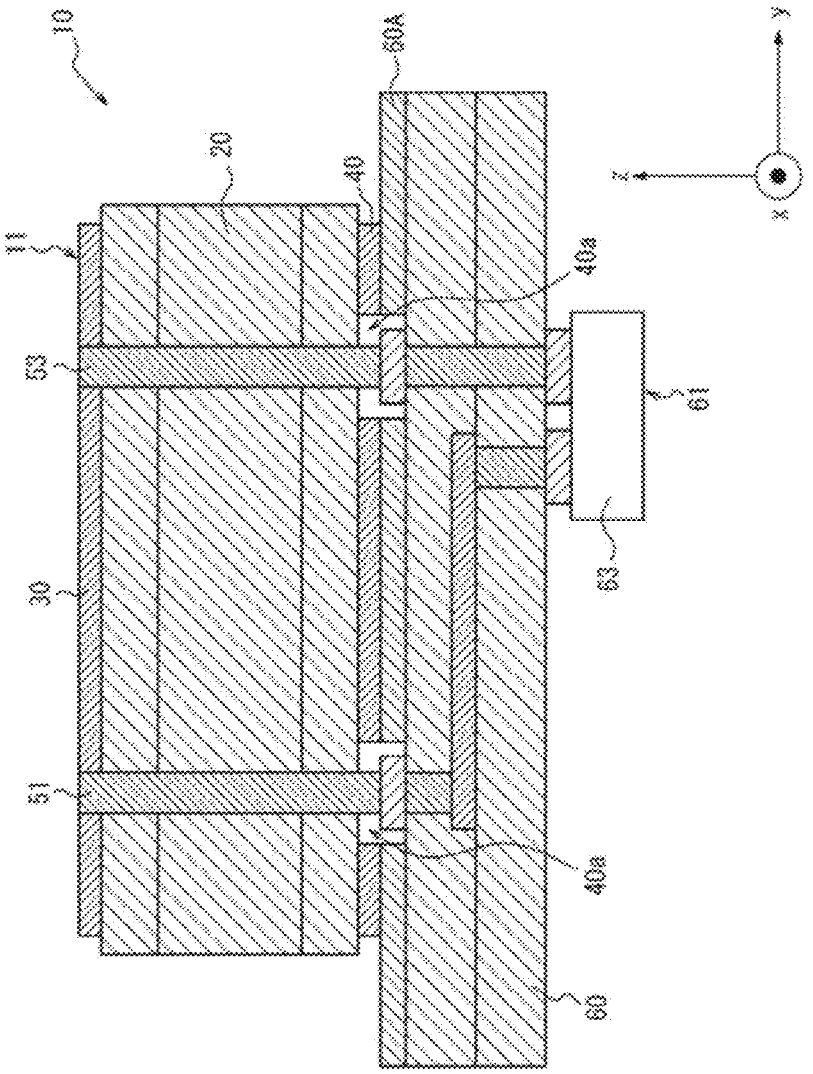
FIG. 2 is a cross-sectional view of the antenna according to an embodiment.

As illustrated in FIGS. 1 and 2, an antenna 10 includes a base 20, a radiation conductor 30, a ground conductor 40, feeding lines 50, and a circuit board 60. The base 20 makes contact with the radiation conductor 30, the ground conductor 40, and the feeding lines 50. The radiation conductor 30, the ground conductor 40, and the feeding lines 50 are configured to function as an antenna element 11. The antenna 10 is configured to oscillate at a predetermined resonance frequency and to radiate electromagnetic waves.

The base 20 can include either a ceramic material or a resin material as its composition. A ceramic material can include an aluminum-oxide-based sintered compact, an aluminum-nitride-based sintered compact, a mullite-based sintered compact, a glass ceramic sintered compact, a crystallized glass formed by depositing crystalline components in a glass matrix, and a microcrystalline sintered compact such as mica or aluminum titanate. A resin material can include epoxy resin, polyester resin, polyimide resin, polyamide-imide resin, polyetherimide resin, and a hardened form of an uncured material such as liquid crystal polymer.

The radiation conductor 30 and the ground conductor 40 can include, in its composition, a metallic material, or a metallic alloy, or a hardened material of metallic paste, or a conductive polymer. The radiation conductor 30 and the ground conductor 40 can be made of the same material. Alternatively, the radiation conductor 30 and the ground conductor 40 can be made of different materials. Still alternatively, some combinations of the radiation conductor 30 and the ground conductor 40 can be made of the same material. The metallic material can include copper, silver, palladium, gold, platinum, aluminum, chromium, nickel, cadmium, lead, selenium, manganese, tin, vanadium, lithium, cobalt, and titanium. An alloy includes a plurality of metallic materials. A metallic paste can be a paste formed by kneading the powder of a metallic metal along with an organic solvent and a binder. The binder can include epoxy resin, polyester resin, polyimide resin, polyamide-imide resin, and polyetherimide resin. The conductive polymer can include polythiophene polymer, polyacetylene polymer, polyaniline polymer, and polypyrrole polymer.

The radiation conductor 30 is configured to function as a resonator. The radiation conductor 30 can be configured as a resonator of the patch type. As an example, the radiation conductor 30 is positioned on top of the base 20. As an example, the radiation conductor 30 is positioned at an end of the base 20 in the z direction. As an example, the radiation conductor 30 can be present within the base 20. Some part of the radiation conductor 30 can be present within the base 20 and some part can be present outside the base 20. Some surface of the radiation conductor 30 can face the outside of the base 20.

As an example according to a plurality of embodiments, the radiation conductor 30 extends in a first plane. The ends of the radiation conductor extend along a first direction and a second direction. In the present embodiment, the first direction (first axis) is treated as the y direction. In the present embodiment, a second direction (third axis) is treated as the x direction. In the present embodiment, the first direction is orthogonal to the second direction. However, in the present disclosure, the first direction need not be orthogonal to the second direction. In the present disclosure, the first direction only needs to intersect with the second direction. In the present embodiment, a third direction (second axis) is treated as the z direction. In the present embodiment, the third direction is orthogonal to the first direction and the second direction. However, in the present disclosure, the third direction need not be orthogonal to the first direction and the second direction. In the present disclosure, the third direction may intersect with the first direction and the second direction. In the present embodiment, the first plane is treated as the x-y plane. In the present embodiment, a second plane is treated as the y-z plane. In the present embodiment, a third plane is treated as the z-x plane. These planes are the planes present in the coordinate space, and do not indicate a specific plate or a specific surface. In the present disclosure, the surface integral in the x-y plane is sometimes called a first surface integral. In the present disclosure, the surface integral in the y-z plane is sometimes called a second surface integral. In the present disclosure, the surface integral in the z-x plane is sometimes called a third surface integral. The surface integral is measured in the unit of square meters. In the present disclosure, the length in the x direction is sometimes simply called the "length". In the present disclosure, the length in the y direction is sometimes simply called the "width". In the present disclosure, the length in the z direction is sometimes simply called the "height".

Figure 4:
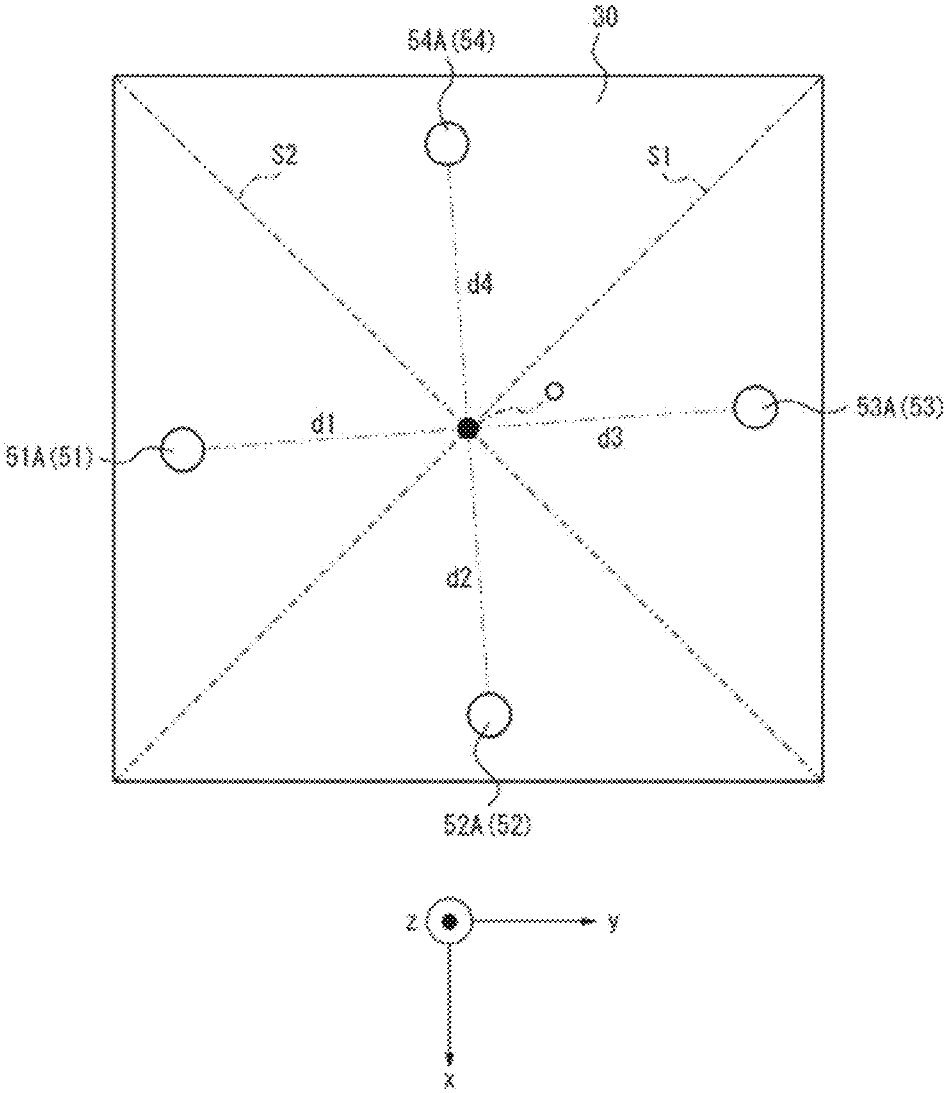
FIG. 4 is a planar view of a radiation conductor according to an embodiment.

As illustrated in FIG. 4, the radiation conductor 30 has a center O. The center O is the center of the radiation conductor 30 in the x and y directions. The radiation conductor 30 can include a first symmetrical axis S1 that extends in the x-y plane. The first symmetrical axis S1 passes through the center O and extends in the direction intersecting with the x and y directions. The first symmetrical axis S1 can extend in the direction that is inclined by 45° from the positive direction of the y axis toward the negative direction of the x axis. The radiation conductor 30 can include a second symmetrical axis S2 in the x-y plane. The second symmetrical axis S2 passes through the center O and extends in a direction intersecting with the first symmetrical axis S1. The second symmetrical axis S2 can extend in the direction inclined by 45° from the positive direction of the y axis toward the positive direction of the x axis. The radiation conductor 30 can be half the size of the operating wavelength. The operating wavelength represents the wavelength of electromagnetic waves in the operating frequency of the antenna 10. The operating wavelength can be same as the wavelength of the resonance frequency of the antenna 10. The operating wavelength can be different from the wavelength of the resonance frequency of the antenna 10. For example, the lengths of the radiation conductor 30 in the x and y directions can be half of the operating wavelength.

According to an example of a plurality of embodiments, the ground conductor 40 can be configured to function as the ground of the antenna element 11. As an example according to a plurality of embodiments, the ground conductor 40 extends in the x-y plane. As illustrated in FIG. 2, the ground conductor 40 faces the radiation conductor 30 in the z direction.

The feeding lines 50 can be configured to supply electrical signals from the outside to the antenna element 11. The feeding lines 50 can be configured to supply electrical signals from the antenna element 11 to the outside. The feeding lines 50 can be through-hole conductors or via conductors. As illustrated in FIG. 1, the feeding lines 50 can include a first feeding line 51, a second feeding line 52, a third feeding line 53, and a fourth feeding line 54.

Each of the first feeding line 51, the second feeding line 52, the third feeding line 53, and the fourth feeding line 54 is configured to be electrically connected to the radiation conductor 30. However, in the present disclosure, each of the first feeding line 51 to the fourth feeding line 54 only needs to be electromagnetically connected to the radiation conductor 30. In the present disclosure, "electromagnetic connection" covers electric connection and magnetic connection. As illustrated in FIG. 4, the points at which the first feeding line 51, the second feeding line 52, the third feeding line 53, and the fourth feeding line 54 are connected to the radiation conductor 30 can be referred to as a feeding point 51A, a feeding point 52A, a feeding point 53A, and a feeding point 54A, respectively. The first feeding line 51, the second feeding line 52, the third feeding line 53, and the fourth feeding line 54 make contact with the radiation conductor 30 at mutually different positions. As illustrated in FIG. 2, the ground conductor 40 has a plurality of openings 40*a* formed thereon. The first feeding line 51, the second feeding line 52, the third feeding line 53, and the fourth feeding line 54 are communicated to the outside via the openings 40*a* of the ground conductor 40. The first feeding line 51 to the fourth feeding line 54 can extend along the z direction.

The first feeding line 51 is configured to contribute at least to supply, to the outside, the electrical signals generated at the time of resonance of the radiation conductor 30 in the y direction. The second feeding line 52 is configured to contribute at least to supply, to the outside, the electrical signals generated at the time of resonance of the radiation conductor 30 in the x direction. The third feeding line 53 is configured to contribute at least to supply, to the outside, the electrical signals generated at the time of resonance of the radiation conductor 30 in the y direction. The fourth feeding line 54 is configured to contribute at least to supply, to the outside, the electrical signals generated at the time of resonance of the radiation conductor 30 in the x direction.

The pair of the first feeding line 51 and the third feeding line 53 and the pair of the second feeding line 52 and the fourth feeding line 54 are configured to excite the radiation conductor 30 in different directions. For example, the first feeding line 51 and the third feeding line 53 are configured to excite the radiation conductor 30 in the y direction. The second feeding line 52 and the fourth feeding line 54 are configured to excite the radiation conductor 30 in the x direction. As a result of having the feeding lines 50, the antenna 10 enables reducing the excitation of the radiation conductor 30 in one direction during the excitation of the radiation conductor 30 in another direction.

The first feeding line 51 and the third feeding line 53 are configured to excite the radiation conductor 30 using a differential voltage. The second feeding line 52 and the fourth feeding line 54 are configured to excite the radiation conductor 30 using a differential voltage. As a result of exciting the radiation conductor 30 using differential voltages, the antenna 10 enables achieving reduction in the fluctuation of the electric potential center at the time of excitation of the radiation conductor 30 from the center O of the radiation conductor 30.

As illustrated in FIG. 4, in the radiation conductor 30, the position of the center O can be between the first feeding line 51 and the third feeding line 53. Thus, when viewed from the center O of the radiation conductor 30, the third feeding line 53 is positioned on the substantially opposite side of the first feeding line 51 in the y direction. A first distance d1 between the first feeding line 51 and the center O is substantially equal to a third distance d3 between the third feeding line 53 and the center O.

As illustrated in FIG. 4, in the radiation conductor 30, the position of the center O can be between the second feeding line 52 and the fourth feeding line 54. When viewed from the center O of the radiation conductor 30, the fourth feeding line 54 is positioned on the substantially opposite side of the second feeding line 52 in the x direction. A second distance d2 between the second feeding line 52 and the center O is substantially equal to a fourth distance d4 between the fourth feeding line 54 and the center O. The second distance d2 can be substantially equal to the first distance d1. The second distance d2 can be different from the first distance d1.

The first feeding line 51 and the second feeding line 52 can be symmetric across the first symmetrical axis S1. The third feeding line 53 and the fourth feeding line 54 can be symmetric across the first symmetrical axis S1. For example, the feeding points 51A and 52A can be axisymmetric with respect to the first symmetrical axis S1 serving as the symmetrical axis. For example, the feeding points 53A and 54A can be axisymmetric with respect to the first symmetrical axis S1 serving as the symmetrical axis. The first feeding line 51 and the fourth feeding line 54 can be symmetric across the second symmetrical axis S2. The second feeding line 52 and the third feeding line 53 can be symmetric across the second symmetrical axis S2. For example, the feeding points 51A and 54A can be axisymmetric with respect to the second symmetrical axis S2 serving as the symmetrical axis. For example, the feeding points 52A and 53A can be axisymmetric with respect to the second symmetrical axis S2 serving as the symmetrical axis.

The direction connecting the first feeding line 51 and the third feeding line 53 is inclined with respect to the y direction. Because of the inclined arrangement of the first feeding line 51 and the third feeding line 53 with respect to the y direction, the first feeding line 51 and the third feeding line 53 become able to excite the radiation conductor 30 in the x direction too. The direction connecting the second feeding line 52 and the fourth feeding line 54 is inclined with respect to the x direction. Because of the inclined arrangement of the second feeding line 52 and the fourth feeding line 54 with respect to the x direction, the second feeding line 52 and the fourth feeding line 54 become able to excite the radiation conductor 30 in the y direction too. The pair of the first feeding line 51 and the third feeding line 53 and the pair of the second feeding line 52 and the fourth feeding line 54 enable excitation of the radiation conductor 30 in two excitation directions. In the antenna 10, because of the excitation of the radiation conductor 30 in two excitation directions, the impedance components in the respective directions act on the feeding lines 50. In the antenna 10, by cancelling out the impedance components in the respective directions, the impedance at the time of input can be reduced. As a result of a decrease in the impedance at the time of input, isolation of two polarization directions can be enhanced in the antenna 10.

Figure 3:
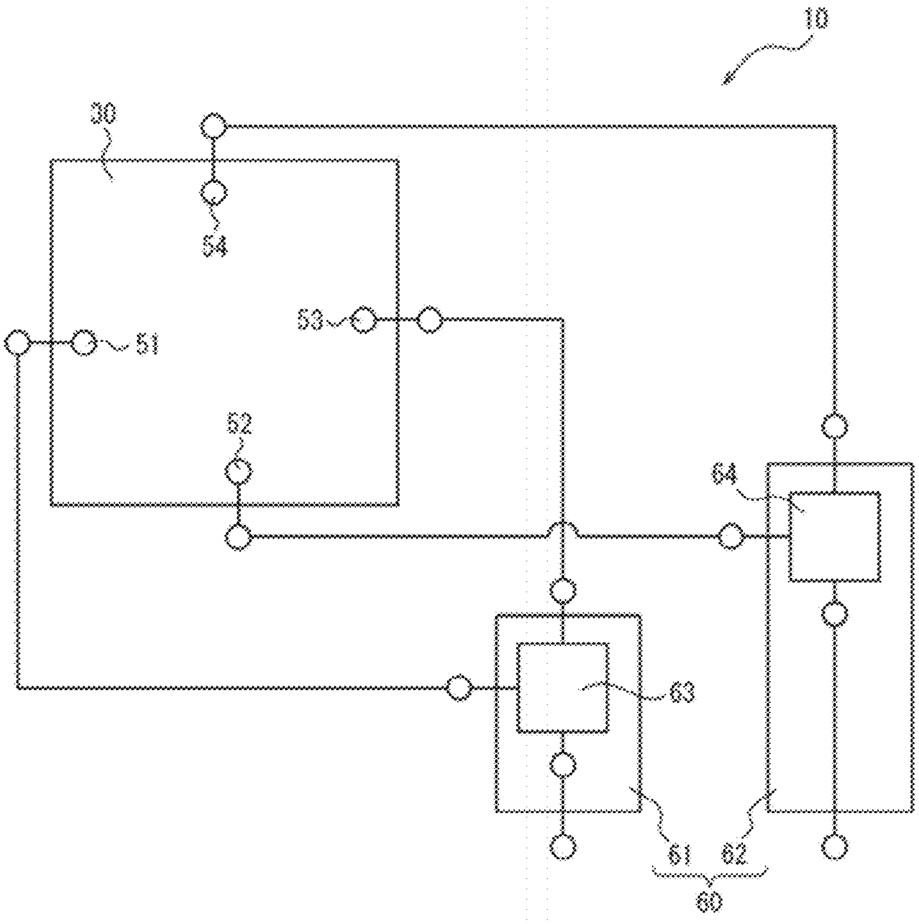
FIG. 3 is a block diagram of the antenna according to an embodiment.

As illustrated in FIG. 2, the circuit board 60 includes a ground conductor 60A. As illustrated in FIG. 3, the circuit board 60 includes a first feeding circuit 61 and a second feeding circuit 62. The circuit board 60 can include either the first feeding circuit 61 or the second feeding circuit 62.

The ground conductor 60A is made of any electroconductive material. The ground conductor 60A can be made of the same material as the radiation conductor 30 and the ground conductor 40, or can be made of a different material from that of the radiation conductor 30 and the ground conductor 40. Some combination of the ground conductor 60A, the radiation conductor 30, and the ground conductor 40 can be made of the same material. The ground conductor 60A can be connected to a ground conductor 140. The ground conductor 60A can be integrated with the ground conductor 140.

The first feeding circuit 61 is electrically connected to the first feeding line 51 and the third feeding line 53. The first feeding circuit 61 is configured to supply reversed-phase signals, which have mutually opposite phases, to the first feeding line 51 and the third feeding line 53. First feeding signals supplied to the first feeding line 51 are substantially opposite in phase to third feeding signals supplied to the third feeding line 53.

The first feeding circuit 61 includes a first inverting circuit 63. Based on a single electrical signal input thereto, the first inverting circuit 63 is capable of outputting two electrical signals having mutually opposite phases. The first inverting circuit 63 can be a circuit for inverting the phase of a single input electrical signal in the resonance frequency band. The first inverting circuit 63 can be a circuit for outputting reversed-phase signals, which have substantially opposite phases to each other, from a single input electrical signal. The first inverting circuit 63 can be a balun, or a power divider circuit, or a delay line memory. The first inverting circuit 63 can include an inductance element connected to one of the first feeding line 51 and the third feeding line 53, and can include a capacitance element connected to the other of the first feeding line 51 and the third feeding line 53.

The second feeding circuit 62 is configured to be electrically connected to the second feeding line 52 and the fourth feeding line 54. The second feeding circuit 62 is configured to supply reversed-phase signals, which have mutually opposite phases, to the second feeding line 52 and the fourth feeding line 54. Second feeding signals supplied to the second feeding line 52 are substantially opposite in phase to fourth feeding signals supplied to the fourth feeding line 54.

The second feeding circuit 62 includes a second inverting circuit 64. Based on a single electrical signal input thereto, the second inverting circuit 64 is capable of outputting two electrical signals having mutually opposite phases. The second inverting circuit 64 can be a circuit for inverting the phase of a single input electrical signal in the resonance frequency band. The second inverting circuit 64 can be a circuit for outputting reversed-phase signals, which have substantially opposite phases to each other, from a single input electrical signal. The second inverting circuit 64 can be a balun, or a power divider circuit, or a delay line memory. The second inverting circuit 64 can include an inductance element connected to one of the second feeding line 52 and the fourth feeding line 54, and can include a capacitance element connected to the other feeding line.

In the antenna 10, electrical signals of opposite phases are fed to the first feeding line 51 and the third feeding line 53. In the antenna 10, when the radiation conductor 30 resonates along the y direction, there is a decrease in the potential variation in the vicinity of the center O of the radiation conductor 30. The antenna 10 is configured to resonate with the node in the vicinity of the center O. In the antenna 10, electrical signals of opposite phases are fed to the second feeding line 52 and the fourth feeding line 54. In the antenna 10, when the radiation conductor 30 resonates along the y direction, there is a decrease in the potential variation in the vicinity of the center O of the radiation conductor 30.

Figure 5:
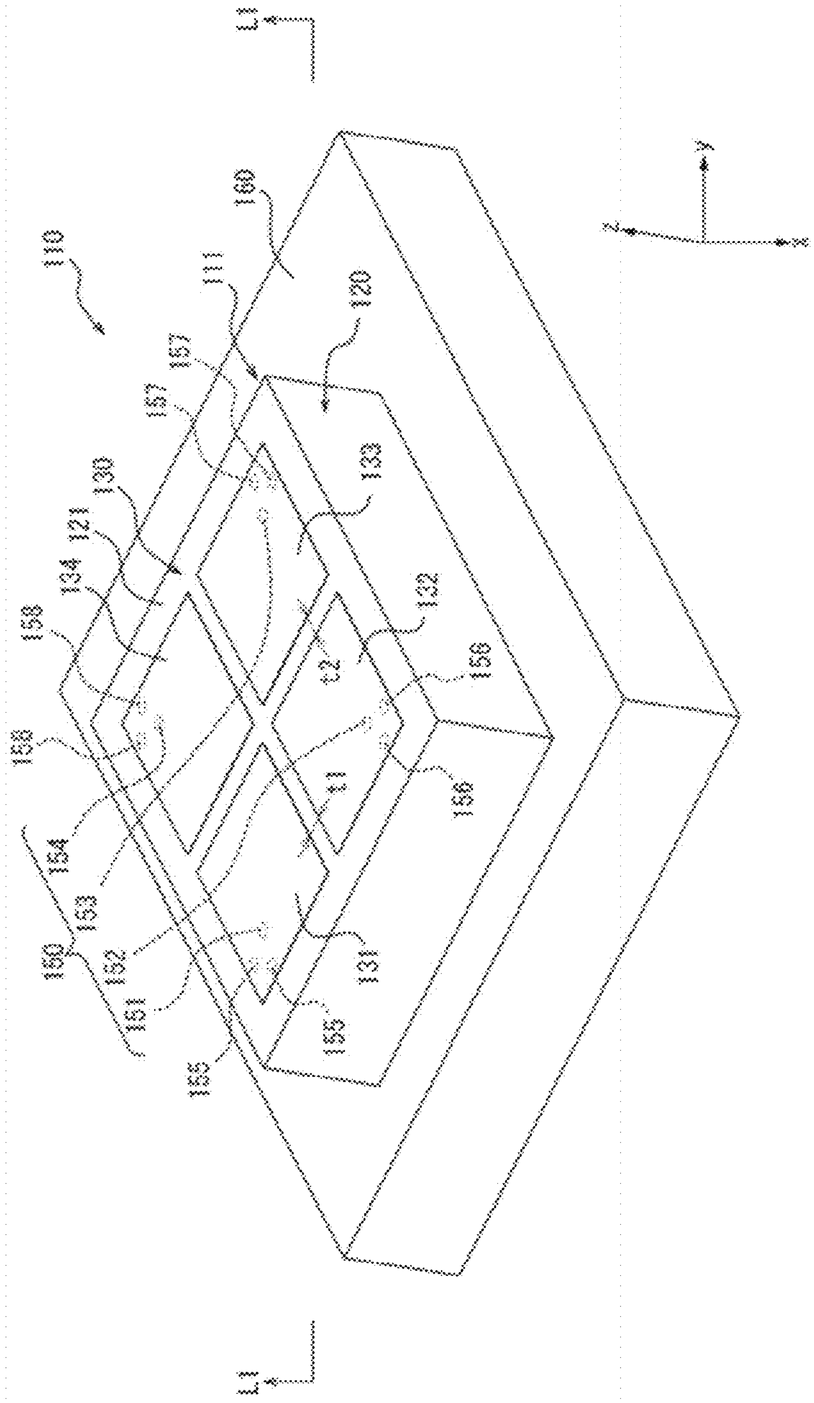
FIG. 5 is a perspective view of an antenna according to an embodiment.
Figure 6:
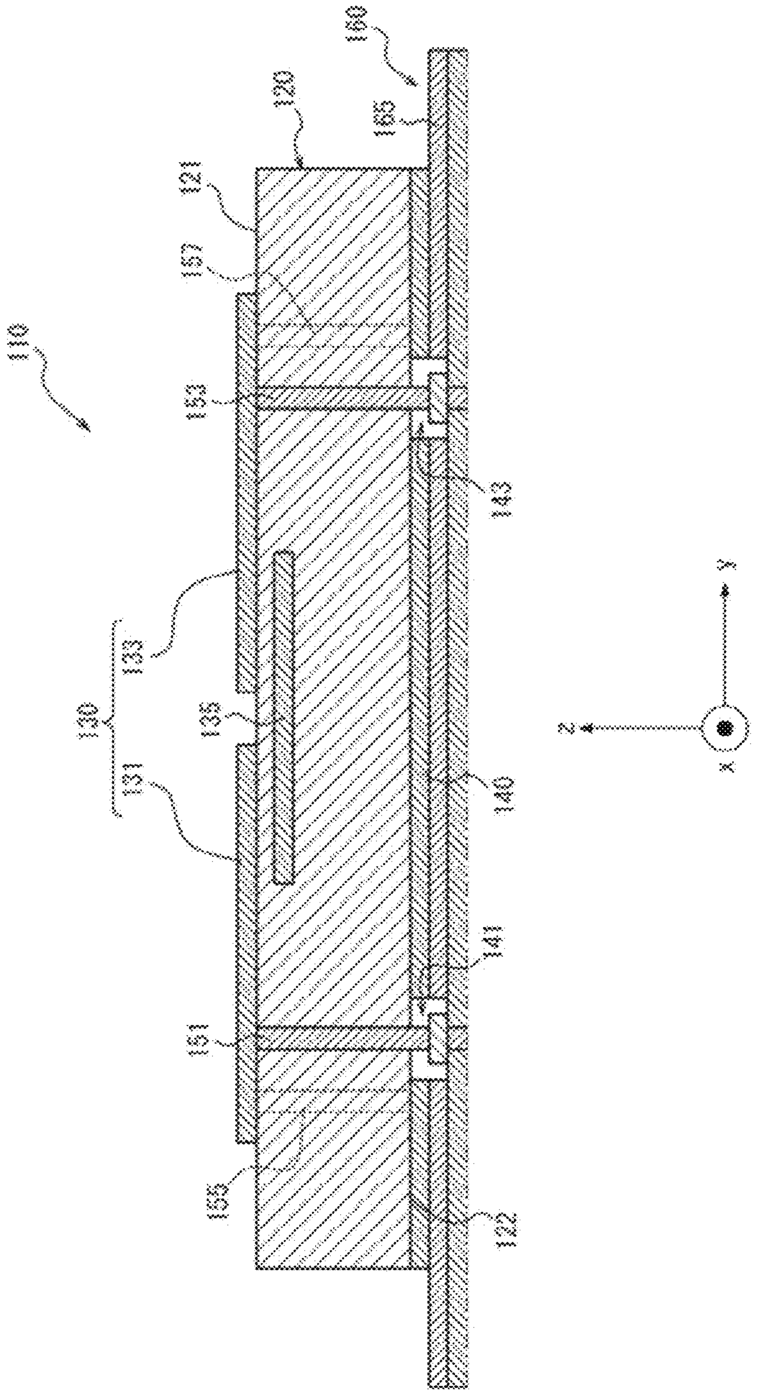
FIG. 6 is a cross-sectional view of the antenna along L1-L1 line illustrated in FIG. 5.
Figure 7:
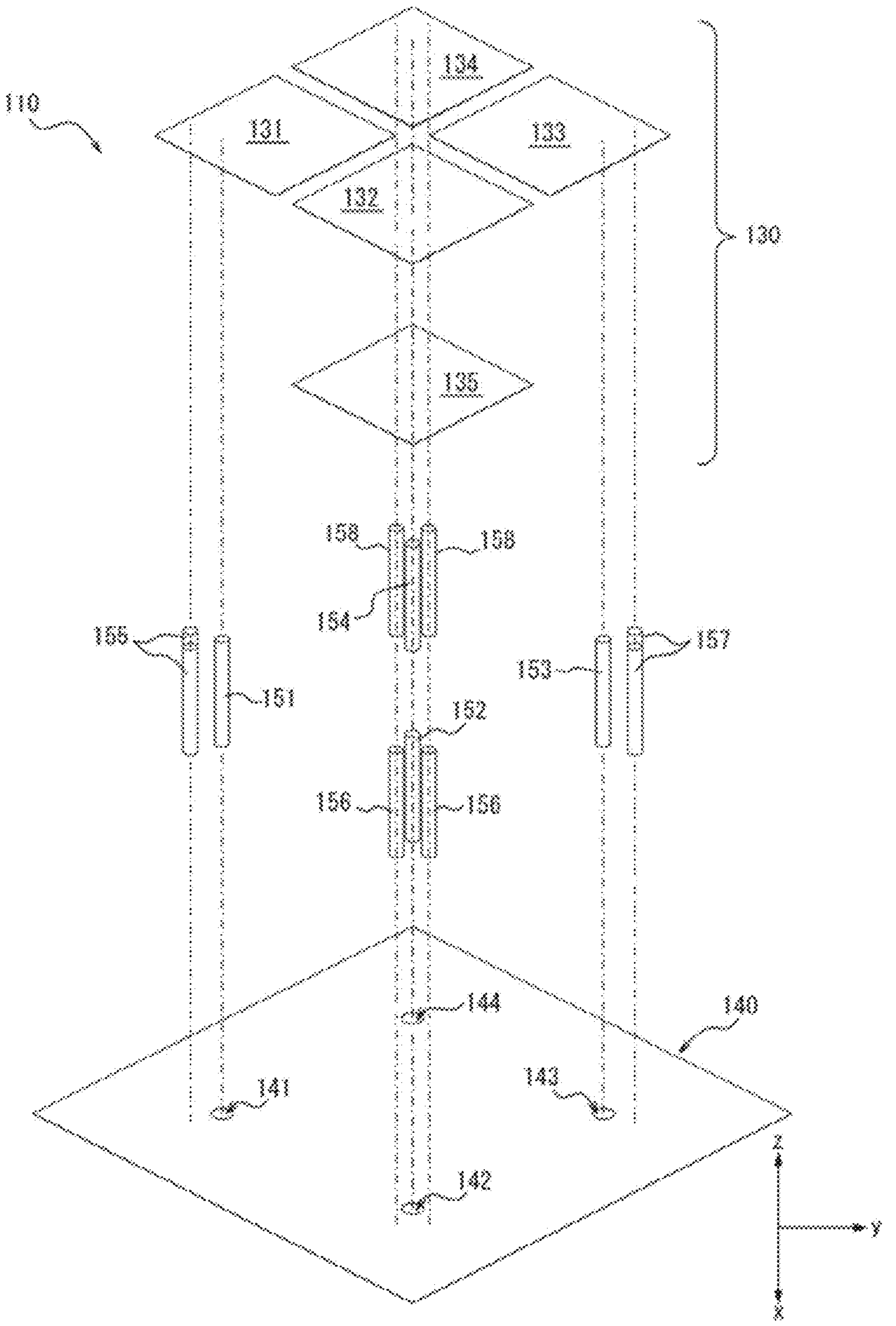
FIG. 7 is an exploded perspective view of a portion of the antenna illustrated in FIG. 5.
Figure 8:
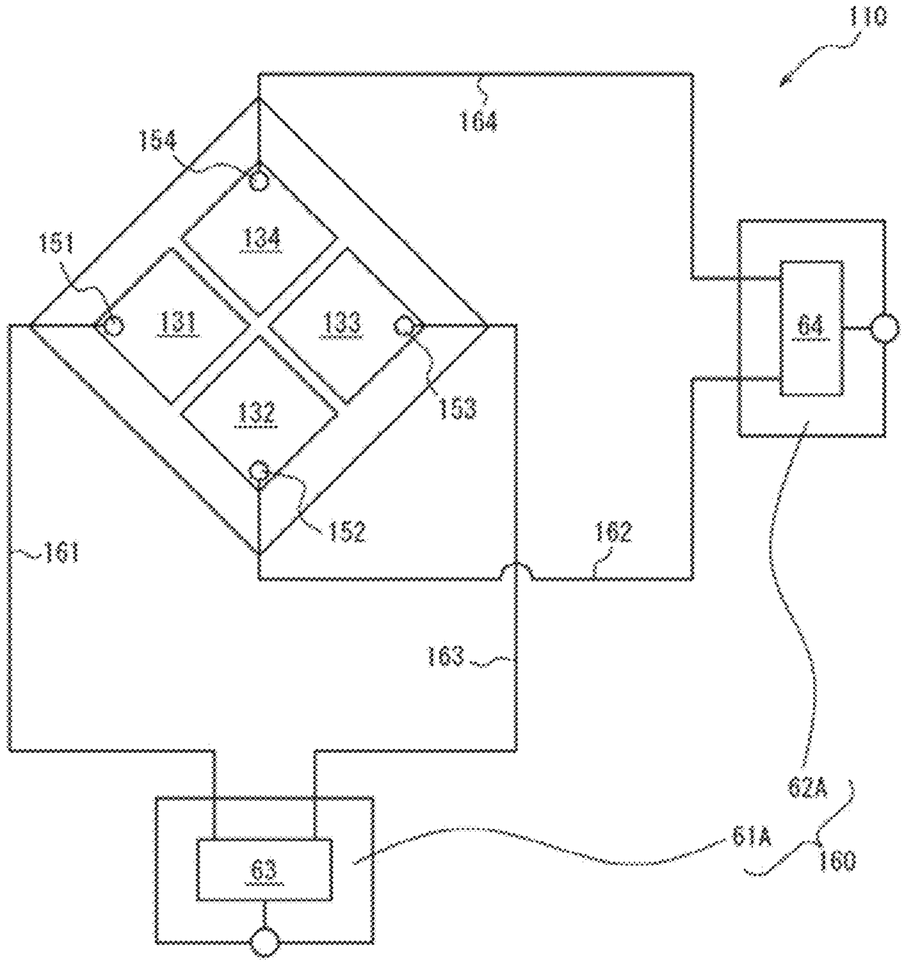
FIG. 8 is a block diagram of the antenna illustrated in FIG. 5.
Figure 9:
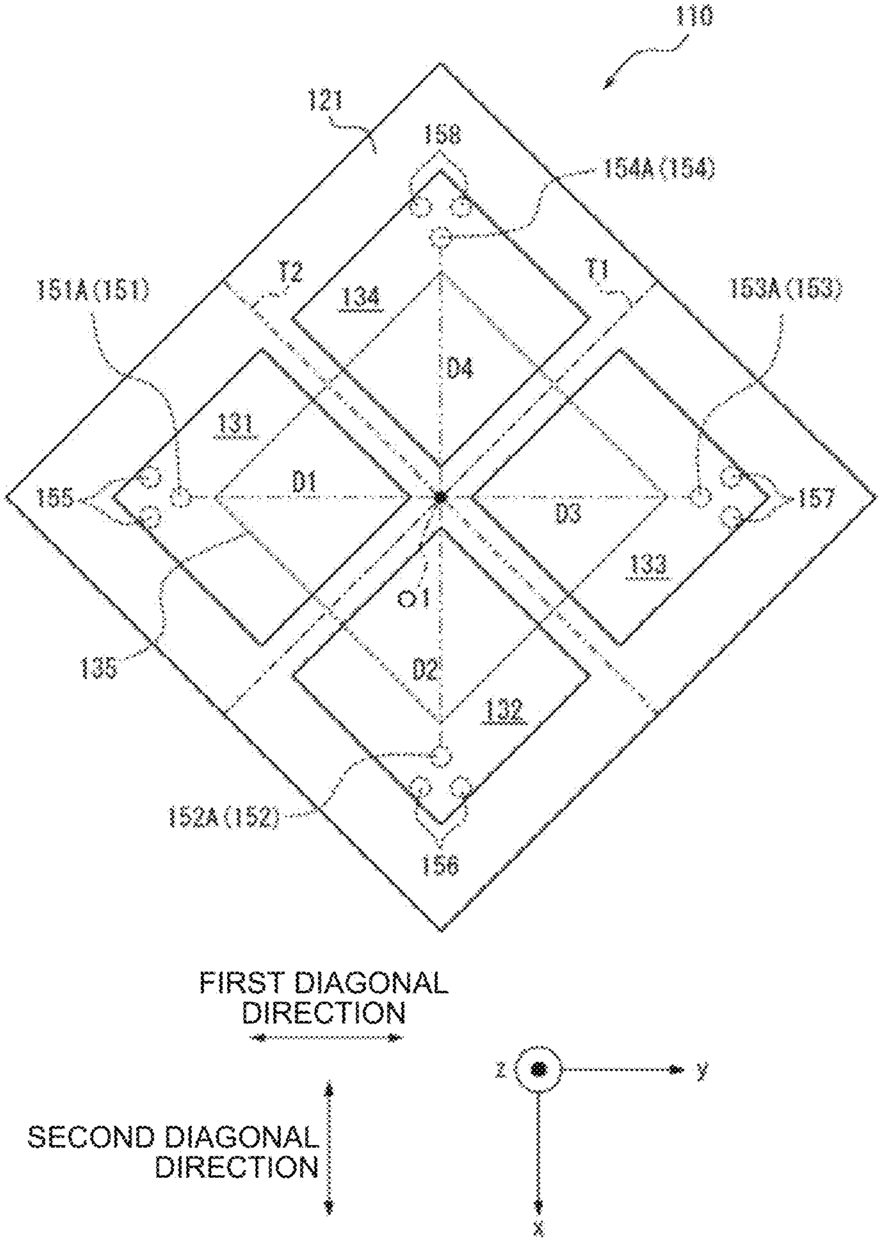
FIG. 9 is a planar view for explaining a configuration of a radiation conductor illustrated in FIG. 5.

FIG. 5 is a perspective view of an antenna 110 according to an embodiment. FIG. 6 is a cross-sectional view of the antenna 110 along L1-L1 line illustrated in FIG. 5. FIG. 7 is an exploded perspective view of a portion of the antenna 110 illustrated in FIG. 5. FIG. 8 is a block diagram of the antenna 110 illustrated in FIG. 5. FIG. 9 is a planar view for explaining a configuration of a radiation conductor 130 illustrated in FIG. 5.

As illustrated in FIGS. 5 and 6, the antenna 110 includes a base 120, the radiation conductor 130, the ground conductor 140, first connecting conductors 155, second connecting conductors 156, third connecting conductors 157, and fourth connecting conductors 158. The antenna 110 includes feeding lines 150 and a circuit board 160. The radiation conductor 130, the ground conductor 140, and the feeding lines 150 function as an antenna element 111. The feeding lines 150 include a first feeding line 151, a second feeding line 152, a third feeding line 153, and a fourth feeding line 154. The numbers of the first connecting conductors 155 to the fourth connecting conductors 158 included in the antenna 110 illustrated in FIG. 5 are each two. However, the numbers of the first connecting conductor 155 to the fourth connecting conductor 158 included in the antenna 110 may be each one or three or more.

The antenna element 111 is configured to oscillate at a predetermined resonance frequency. As a result of oscillation of the antenna element 111 at a predetermined resonance frequency, the antenna 110 can be configured to radiate electromagnetic waves. As the operating frequency thereof, the antenna 110 can use at least one of one or more resonance frequency bands of the antenna element 111. The antenna 110 can radiate electromagnetic waves of the operating frequency. The wavelength of the operating frequency can be the operating wavelength that represents the wavelength of the electromagnetic waves in the operating frequency of the antenna 110.

As explained later, the antenna element 111 exhibits an artificial magnetic conductor character with respect to the electromagnetic waves of a predetermined frequency that are incident from the positive direction of the z axis on a surface substantially parallel to the x-y plane of the antenna element 111. In the present disclosure, the artificial magnetic conductor character implies the characteristics of a surface that has zero phase difference between the incident waves and the reflected waves in the operating frequency. A surface exhibiting the artificial magnetic conductor character has the phase difference between the incident waves and the reflected waves to be in the range from −90° to +90° in the operating frequency band. The operating frequency band includes the resonance frequency and the operating frequency that exhibit the artificial magnetic conductor character.

Since the antenna element 111 exhibits the artificial magnetic conductor character, as illustrated in FIG. 5, even when a ground conductor 165 (described later) of the circuit board 160 is positioned on the side of the negative direction of the z axis of the antenna 110, the radiation efficiency of the antenna 110 can be maintained.

The base 120 is made of the same material or a similar material as the base 20 illustrated in FIG. 1. The base 120 makes contact with the radiation conductor 130, the ground conductor 140, and the feeding lines 150. The base 120 can have the shape corresponding to the shape of the radiation conductor 130. The base 120 can have the shape of a substantially square prism. The base 120 has a top surface 121 and an under surface 122. The top surface 121 and the under surface 122 can be the top surface and the bottom surface, respectively, of the base 120 having the shape of a substantially square prism. The top surface 121 and the under surface 122 can be substantially parallel to the x-y plane. The top surface 121 and the under surface 122 can be substantially square in shape. In the top surface 121 and the under surface 122 that are substantially square in shape, one of the two diagonal lines runs along the x direction, while the other diagonal line runs along the y direction. As compared to the under surface 122, the top surface 121 is positioned more on the side of the positive direction of the z axis.

The radiation conductor 130 is configured to function as a resonator. The radiation conductor 130 is made of the same material or a similar material as the radiation conductor 30 illustrated in FIG. 1. As illustrated in FIG. 6, the radiation conductor 130 can be positioned on the top surface 121 of the base 120. The radiation conductor 130 extends along the x-y plane. The radiation conductor 130 is configured to capacitively connect the connecting conductors from the first connecting conductor 155 to the fourth connecting conductor 158. In the x-y plane, the radiation conductor 130 is surrounded by the first connecting conductor 155 to the fourth connecting conductor 158.

The radiation conductor 130 can be configured to resonate in the y direction when, for example, mutually reversed-phased electrical signals are supplied from the first feeding line 151 and the third feeding line 153. When the radiation conductor 130 resonates in the y direction; from the radiation conductor 130, the first connecting conductor 155 is seen as an electrical conductor positioned on the side of the negative direction of the y axis, and the third connecting conductor 157 is seen as an electrical conductor positioned on the side of the positive direction of the y axis. When the radiation conductor 130 resonates in the y direction; from the radiation conductor 130, the side in the positive direction the x axis is seen as magnetic conductor, and the side in the negative direction of the x axis is seen as magnetic conductor. When the radiation conductor 130 resonates in the y direction, the radiation conductor 130 is surrounded by two electrical conductors and two magnetic conductors. Hence, the antenna 110 can be configured to exhibit the artificial magnetic conductor character with respect to the electromagnetic waves of a predetermined frequency that are incident from the positive direction of the z axis on the x-y plane included in the antenna 110.

The radiation conductor 130 can be configured to resonate in the x direction when, for example, mutually reversed-phased electrical signals are supplied from the second feeding line 152 and the fourth feeding line 154. When the radiation conductor 130 resonates in the x direction; from the radiation conductor 130, the second connecting conductor 156 is seen as an electrical conductor positioned on the side of the positive direction of the x axis, and the fourth connecting conductor 158 is seen as an electrical conductor positioned on the side of the negative direction of the x axis. When the radiation conductor 130 resonates in the x direction; from the radiation conductor 130, the side on the positive direction of the y axis is seen as magnetic conductor, and the negative direction of the y axis is seen as magnetic conductor. When the radiation conductor 130 resonates in the x direction, the radiation conductor 130 is surrounded by two electrical conductors and two magnetic conductors. Hence, the antenna 110 can be configured to exhibit the artificial magnetic conductor character with respect to the electromagnetic waves of a predetermined frequency that are incident from the positive direction of the z axis on the x-y plane included in the antenna 110.

As illustrated in FIG. 9, the radiation conductor 130 has a center O1. The center O1 is the center of the radiation conductor 130 in the x and y directions. The radiation conductor 130 can include a first symmetrical axis T1 that extends along the x-y plane. The first symmetrical axis T1 passes through the center O1 and extends in the direction intersecting with the x and y directions. The first symmetrical axis T1 can extend in the direction inclined by 45° from the positive direction of the y axis toward the negative direction of the x axis. The radiation conductor 130 can be half the size of the operating wavelength. For example, of the radiation conductor 130, the lengths in the x and y directions can be half of the operating wavelength.

As illustrated in FIG. 7, the radiation conductor 130 includes a first conductor 131, a second conductor 132, a third conductor 133, and a fourth conductor 134. The radiation conductor 130 can further include an internal conductor 135. The first conductor 131 to the fourth conductor 134, the internal conductor 135, the ground conductor 140, the first feeding line 151 to the fourth feeding line 154, and the first connecting conductor 155 to the fourth connecting conductor 158 can all be made of either the same material or different materials. Some combination of the first conductor 131 to the fourth conductor 134, the internal conductor 135, the ground conductor 140, the first feeding line 151 to the fourth feeding line 154, and the first connecting conductor 155 to the fourth connecting conductor 158 can be made of the same material.

The first conductor 131 to the fourth conductor 134 can have the same shape, such as a substantially square shape. The two diagonal lines of the substantially square first conductor 131 and the two diagonal lines of the substantially square third conductor 133 run along the x and y directions. The length of that diagonal line of the first conductor 131 which runs along the y direction and the length of that diagonal line of the third conductor 133 which runs along the y direction can be about one-fourth of the operating wavelength. The two diagonal lines of the substantially square second conductor 132 and the two diagonal lines of the substantially square fourth conductor 134 run along the x and y directions. The length of that diagonal line of the second conductor 132 which runs along the x direction and the length of that diagonal line of the fourth conductor 134 which runs along the x direction can be about one-fourth of the operating wavelength.

At least some part of each of the first conductor 131 to the fourth conductor 134 can be exposed to the outside of the base 120. Some part of each of the first conductor 131 to the fourth conductor 134 can be positioned within the base 120. Each of the first conductor 131 to the fourth conductor 134 can be entirely positioned within the base 120.

The first conductor 131 to the fourth conductor 134 extend along the top surface 121 of the base 120. As an example, the first conductor 131 to the fourth conductor 134 can be arranged in form of a square lattice on the top surface 121. In that case, the pair of the first conductor 131 and the fourth conductor 134 as well as the pair of the second conductor 132 and the third conductor 133 can be arranged along the first diagonal axis T1. The pair of the first conductor 131 and the second conductor 132 as well as the pair of the fourth conductor 134 and the third conductor 133 can be arranged along the second diagonal axis T2. In the square lattice in which the first conductor 131 to the fourth conductor 134 are arranged, the two diagonal directions run along the x and y directions. Of those two diagonal directions, the diagonal direction running along the y direction is referred to as a first diagonal direction. Of those two diagonal direction, the diagonal direction running along the x direction is referred to as a second diagonal direction. The first diagonal direction and the second diagonal direction can intersect at the center O1.

The first conductor 131 to the fourth conductor 134 are positioned away from each other with predetermined spacing maintained therebetween. For example, as illustrated in FIG. 5, the first conductor 131 and the second conductor 132 are positioned away from each other with a spacing t1 maintained therebetween. The third conductor 133 and the fourth conductor 134 are positioned away from each other with the spacing t1 maintained therebetween. The first conductor 131 and the fourth conductor 134 are positioned away from each other with a spacing t2 maintained therebetween. The second conductor 132 and the third conductor 133 are positioned away from each other with the spacing t2 maintained therebetween. By positioning the first conductor 131 to the fourth conductor 134 away from each other with predetermined spacing maintained therebetween, they are configured to be capacitively connected to each other.

As illustrated in FIG. 7, the internal conductor 135 faces the first conductor 131 to the fourth conductor 134 in the z direction. As compared to the first conductor 131 to the fourth conductor 134, the internal conductor 135 is positioned more in the negative direction of the z axis. As illustrated in FIG. 6, the internal conductor 135 can be positioned within the base 120. However, when each of the first conductor 131 to the fourth conductor 134 is entirely positioned within the base 120, the internal conductor 135 can be positioned more in the positive direction of the z axis as compared to the first conductor 131 to the fourth conductor 134. In that case, at least some part of the internal conductor 135 can be exposed from the top surface 121 of the base 120.

The internal conductor 135 is configured to be capacitively connected to each of the first conductor 131 to the fourth conductor 134. For example, some part of the base 120 can be present between the internal conductor 135 and the first conductor 131 to the fourth conductor 134. Because of the presence of some part of the base 120 between the internal conductor 135 and the first conductor 131 to the fourth conductor 134, the internal conductor 135 can be configured to be capacitively connected to each of the first conductor 131 to the fourth conductor 134. The surface integral in the x-y plane of the internal conductor 135 can be appropriately adjusted by taking into account the desired capacitive coupling strength between the internal conductor 135 and the first conductor 131 to the fourth conductor 134. The distances between the internal conductor 135 and the first conductor 131 to the fourth conductor 134 in the z direction can be appropriately adjusted by taking into account the desired capacitive coupling strength between the internal conductor 135 and the first conductor 131 to the fourth conductor 134.

The internal conductor 135 can be substantially parallel to the x-y plane. The internal conductor 135 can be substantially square in shape. The center of the substantially square internal conductor 135 can substantially coincide with the center O1 in the first conductor 131 to the fourth conductor 134. Of the two diagonal lines of the substantially square internal conductor 135, one diagonal line can run along the first diagonal direction and the other diagonal line can run along the second diagonal direction.

The ground conductor 140 is made of the same material or a similar material as the ground conductor 40 illustrated in FIG. 2. The ground conductor 140 is configured to function as the ground conductor of the antenna element 111. As illustrated in FIG. 6, the ground conductor 140 can be configured to be connected to the ground conductor 165 (described later) of the circuit board 160. In that case, the ground conductor 140 can be integrated with the ground conductor 165 of the circuit board 160. The ground conductor 140 can be a plate conductor. The ground conductor 140 is positioned on the under surface 122 of the base 120.

As illustrated in FIG. 7, the ground conductor 140 extends along the x-y plane. In the z direction, the ground conductor 140 faces the radiation conductor 130. The base 120 is present between the ground conductor 140 and the radiation conductor 130. The ground conductor 140 can have the shape corresponding to the shape of the radiation conductor 130. In the present embodiment, the ground conductor 140 is substantially square in shape corresponding to the substantially square shape of the radiation conductor 130. However, the ground conductor 140 can have an arbitrary shape according to the radiation conductor 130. The ground conductor 140 has openings 141, 142, 143, and 144 formed thereon. The positions of the openings 141 to 144 on the x-y plane can be appropriately adjusted according to the positions of the first feeding line 151 to the fourth feeding line 154, respectively, in the x-y plane.

The feeding lines 150 are made of the same material or a similar material as the feeding lines 50 illustrated in FIG. 1. The feeding lines 150 can be through-hole conductors or via conductors. The feeding lines 150 are configured to be able to supply electrical signals from the antenna element 111 to the circuit board 160 present on the outside. The first feeding line 151 to the fourth feeding line 154 make contact with the radiation conductor 130 at mutually different positions. For example, as illustrated in FIG. 5, the first feeding line 151 is configured to be electrically connected to the first conductor 131. The second feeding line 152 is configured to be electrically connected to the second conductor 132. The third feeding line 153 is configured to be electrically connected to the third conductor 133. The fourth feeding line 154 is configured to be electrically connected to the fourth conductor 134. However, the first feeding line 151 to the fourth feeding line 154 can be configured to be magnetically connected to the first conductor 131 to the fourth conductor 134, respectively. The points at which the first feeding line 151 to the fourth feeding line 154 are connected to the first conductor 131 to the fourth conductor 134, respectively, can be referred to as a feeding point 151A, a feeding point 152A, a feeding point 153A, and a feeding point 154A, respectively. As illustrated in FIG. 6, the first feeding line 151 to the fourth feeding line 154 are communicated to the outside via the openings 141 to 144, respectively, of the ground conductor 140. The first feeding line 151 to the fourth feeding line 154 can extend along the z direction.

The first feeding line 151 and the third feeding line 153 are configured to at least contribute in supplying, to the outside, the electrical signals generated at the time of resonance of the radiation conductor 130 in the y direction. The second feeding line 152 and the fourth feeding line 154 are configured to at least contribute in supplying, to the outside, the electrical signals generated at the time of resonance of the radiation conductor 130 in the x direction.

The pair of the first feeding line 151 and the third feeding line 153 and the pair of the second feeding line 152 and the fourth feeding line 154 are configured to excite the radiation conductor 130 in different directions. For example, the first feeding line 151 and the third feeding line 153 are configured to excite the radiation conductor 130 in the y direction. The second feeding line 152 and the fourth feeding line 154 are configured to excite the radiation conductor 130 in the x direction. As a result of having the feeding lines 150, the antenna 110 enables achieving reduction in the occurrence of a situation in which, at the time of exciting the radiation conductor 130 in one direction, it gets excited in another direction.

The first feeding line 151 and the third feeding line 153 are configured to excite the radiation conductor 130 using a differential voltage. The second feeding line 152 and the fourth feeding line 154 are configured to excite the radiation conductor 130 using a differential voltage. As a result of exciting the radiation conductor 130 using differential voltages, the antenna 110 enables achieving reduction in the fluctuation of the electric potential center at the time of excitation of the radiation conductor 130 from the center O of the radiation conductor 130.

As illustrated in FIG. 9, in the y direction, the center O1 of the radiation conductor 130 is positioned between the first feeding line 151 and the third feeding line 153. A first distance D1 between the first feeding line 151 and the center O1 is substantially equal to a third distance D3 between the third feeding line 153 and the center O1.

As illustrated in FIG. 9, in the x direction, the center O1 of the radiation conductor 130 is positioned between the second feeding line 152 and the fourth feeding line 154. A second distance D2 between the second feeding line 152 and the center O1 is substantially equal to a fourth distance D4 between the fourth feeding line 154 and the center O1. In the present embodiment, the second distance D2 is substantially equal to the first distance D1. However, the second distance D2 can be different from the first distance D1.

The first feeding line 151 and the second feeding line 152 can be symmetric across the first symmetrical axis T1. The third feeding line 153 and the fourth feeding line 154 can be symmetric across the first symmetrical axis T1. For example, the feeding points 151A and 152A as well as the feeding points 153A and 154A can be axisymmetric with respect to the first symmetrical axis T1.

The first feeding line 151 and the fourth feeding line 154 can be symmetric across the second symmetrical axis T2. The second feeding line 152 and the third feeding line 153 can be symmetric across the second symmetrical axis T2. For example, the feeding points 151A and 154A as well as the feeding points 152A and 153A can be axisymmetric with respect to the second symmetrical axis T2.

The direction connecting the first feeding line 151 and the third feeding line 153 runs along the y direction. The direction connecting the first feeding line 151 and the third feeding line 153 runs along the first diagonal direction. The direction connecting the second feeding line 152 and the fourth feeding line 154 runs along the x direction. The direction connecting the second feeding line 152 and the fourth feeding line 154 runs along the second diagonal direction. However, as explained later with reference to FIG. 15, the direction connecting the first feeding line 151 and the third feeding line 153 can be inclined with respect to the first diagonal direction. The direction connecting the second feeding line 152 and the fourth feeding line 154 can be inclined with respect to the second diagonal direction.

As illustrated in FIG. 8, the circuit board 160 includes a first feeding circuit 61A and a second feeding circuit 62A. As illustrated in FIG. 6, the circuit board 160 includes the ground conductor 165.

The first feeding circuit 61A is configured to be electrically connected to the first feeding line 151 and the third feeding line 153. The first feeding circuit 61A includes the first inverting circuit 63, first wiring 161, and third wiring 163. In the present embodiment, the first inverting circuit 63 can include an inductance element connected to one of the first feeding line 151 and the third feeding line 153, and can include a capacitance element connected to the other feeding line. The first feeding circuit 61A is configured to supply reversed-phase signals, which have substantially opposite phases to each other, to the first feeding line 151 and the third feeding line 153. In the antenna 110, electrical signals having opposite phases are supplied to the first feeding line 151 and the third feeding line 153. In the antenna 110, when the radiation conductor 130 resonates along the y direction, there is a decrease in the potential variation of the first conductor 131 to the fourth conductor 134 in the vicinity of the center O1. When the radiation conductor 130 resonates along the y direction, the antenna 110 is configured to resonate with a node in the vicinity of the center O1.

The second feeding circuit 62A is configured to be electrically connected to the second feeding line 152 and the fourth feeding line 154. The second feeding circuit 62A includes the second inverting circuit 64, second wiring 162, and fourth wiring 164. In the present embodiment, the second inverting circuit 64 can include an inductance element connected to one of the second feeding line 152 and the fourth feeding line 154, and can include a capacitance element connected to the other feeding line. The second feeding circuit 62A is configured to supply reversed-phase signals, which have substantially opposite phases to each other, to the second feeding line 152 and the fourth feeding line 154. In the antenna 110, electrical signals having opposite phases are supplied to the second feeding line 152 and the fourth feeding line 154. In the antenna 110, when the radiation conductor 130 resonates along the x direction, there is a decrease in the potential variation of the first conductor 131 to the fourth conductor 134 in the vicinity of the center O1. When the radiation conductor 130 resonates along the x direction, the antenna 110 is configured to resonate with a node in the vicinity of the center O1.

The first wiring 161 to the fourth wiring 164 are made of an arbitrary electroconductive material. As described later, the first wiring 161 to the fourth wiring 164 are formed as wiring patterns.

As illustrated in FIG. 8, the first wiring 161 is configured to electrically connect the first inverting circuit 63 and the first feeding line 151. The second wiring 162 is configured to electrically connect the second inverting circuit 64 and the second feeding line 152. The third wiring 163 is configured to electrically connect the first inverting circuit 63 and the third feeding line 153. The fourth wiring 164 is configured to electrically connect the second inverting circuit 64 and the fourth feeding line 154.

The wiring length and the width of the first wiring 161 can be substantially equal to the wiring length and the width of the third wiring 163. When the wiring length and the width of the first wiring 161 is substantially equal to the wiring length and the width of the third wiring 163, then the impedance of the first wiring 161 can become substantially equal to the impedance of the third wiring 163.

The wiring length and the width of the second wiring 162 can be substantially equal to the wiring length and the width of the fourth wiring 164. When the wiring length and the width of the second wiring 162 is substantially equal to the wiring length and the width of the fourth wiring 164, then the impedance of the second wiring 162 can become substantially equal to the impedance of the fourth wiring 164.

The ground conductor 165 can be made of an arbitrary electroconductive material. The ground conductor 165 can represent a conductor layer. Of the two surfaces of the circuit board 160 that are substantially parallel to the x-y plane, the surface positioned on the side of the positive direction of the z axis has the ground conductor 165 installed thereon.

Figure 10:
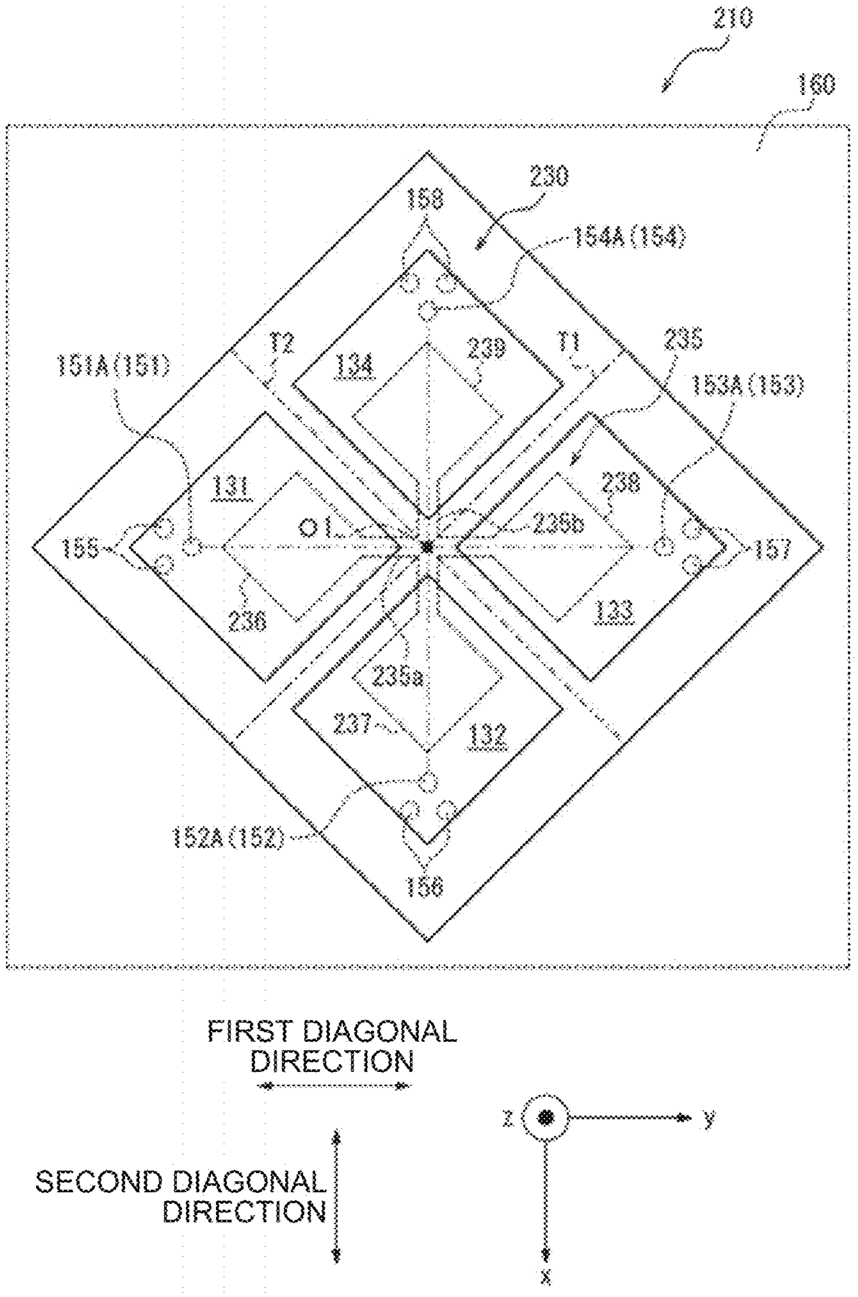
FIG. 10 is a perspective view of an antenna according to an embodiment.
Figure 11:
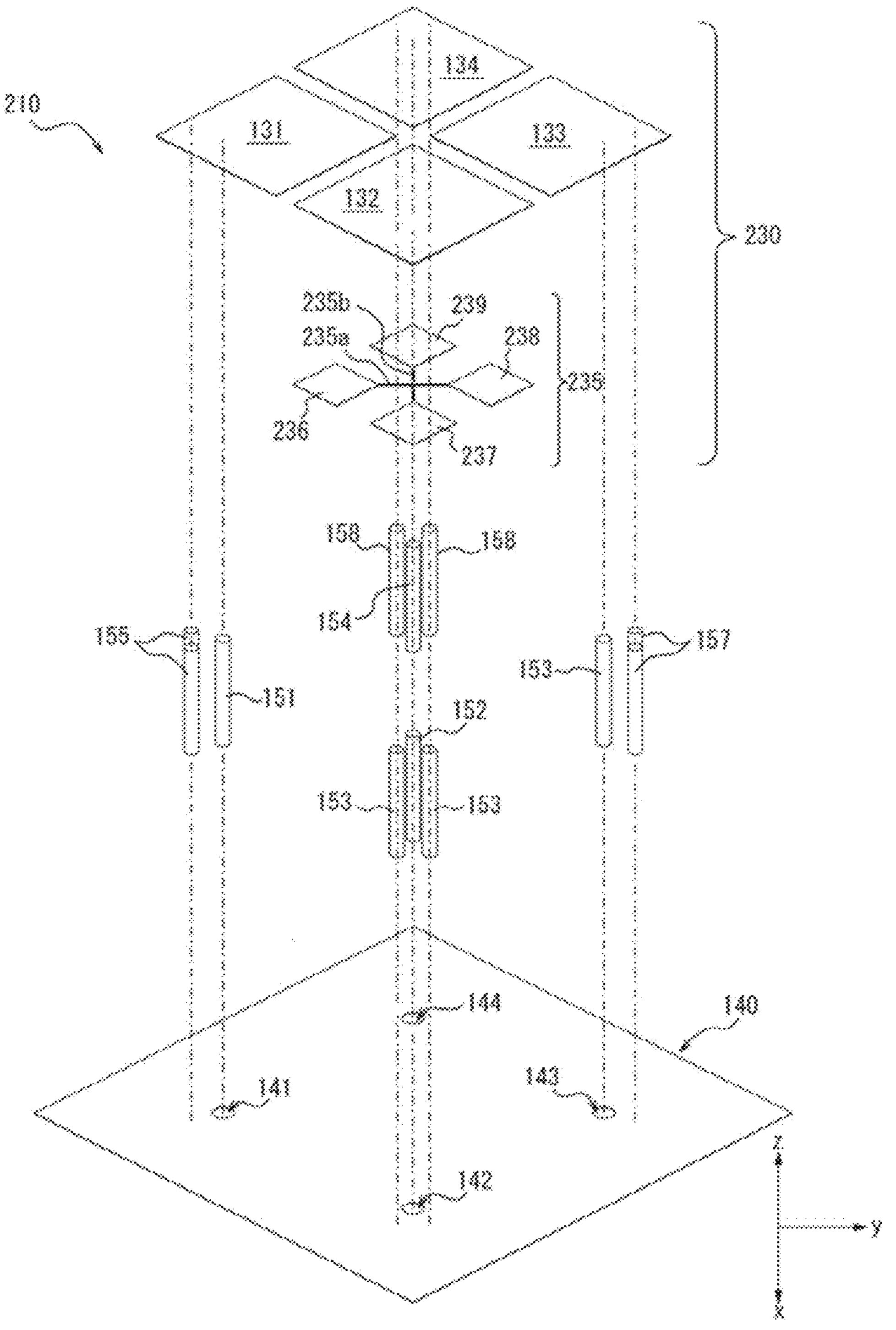
FIG. 11 is an exploded perspective view of a portion of the antenna illustrated in FIG. 10.

FIG. 10 is a perspective view of an antenna 210 according to an embodiment. FIG. 11 is an exploded perspective view of a portion of the antenna 210 illustrated in FIG. 10. The following explanation is given about the major differences between the antenna 210 illustrated in FIG. 10 and the antenna 110 illustrated in FIG. 5.

As illustrated in FIGS. 10 and 11, the antenna 210 includes the base 120, a radiation conductor 230, the ground conductor 140, and the first connecting conductor 155 to the fourth connecting conductor 158. The antenna 210 includes the first feeding line 151, the second feeding line 152, the third feeding line 153, the fourth feeding line 154, and the circuit board 160. The radiation conductor 230, the ground conductor 140, the first connecting conductor 155 to the fourth connecting conductor 158, and the feeding lines 150 are configured to function as an antenna element 211.

As illustrated in FIG. 11, the radiation conductor 230 includes the first conductor 131 to the fourth conductor 134 and an internal conductor 235. The internal conductor 235 can be made of the same material or a similar material as the internal conductor 135 illustrated in FIG. 7. The internal conductor 235 includes a first branch portion 235*a*, a second branch portion 235*b*, a first internal conductor 236, a second internal conductor 237, a third internal conductor 238, and a fourth internal conductor 239. The first branch portion 235*a*, the second branch portion 235*b*, the first internal conductor 236, the second internal conductor 237, the third internal conductor 238, and the fourth internal conductor 239 can all be made of either the same material or different materials. Some combination of the first branch portion 235*a*, the second branch portion 235*b*, the first internal conductor 236, the second internal conductor 237, the third internal conductor 238, and the fourth internal conductor 239 can be made of the same material.

The first internal conductor 236 faces the first conductor 131 in the z direction. The first internal conductor 236 is positioned away from the first conductor 131 in the z direction. In the x-y plane, the entire first internal conductor 236 can overlap with the first conductor 131. The surface integral in the x-y plane of the first internal conductor 236 can be smaller than the surface integral in the x-y plane of the first conductor 131. Since some part of the base 120 is present between the first internal conductor 236 and the first conductor 131, the first internal conductor 236 is configured to be capacitively connected to the first conductor 131. The position of the first internal conductor 236 in the x-y plane can be appropriately adjusted according to the position of the first conductor 131 in the x-y plane.

The second internal conductor 237 faces the second conductor 132 in the z direction. The second internal conductor 237 is positioned away from the second conductor 132 in the z direction. In the x-y plane, the entire second internal conductor 237 can overlap with the second conductor 132. The surface integral in the x-y plane of the second internal conductor 237 can be smaller than the surface integral in the x-y plane of the second conductor 132. Since some part of the base 120 is present between the second internal conductor 237 and the second conductor 132, the second internal conductor 237 is configured to be capacitively connected to the second conductor 132. The position of the second internal conductor 237 in the x-y plane can be appropriately adjusted according to the position of the second conductor 132 in the x-y plane.

The third internal conductor 238 faces the third conductor 133 in the z direction. The third internal conductor 238 is positioned away from the third conductor 133 in the z direction. In the x-y plane, the entire third internal conductor 238 can overlap with the third conductor 133. The surface integral in the x-y plane of the third internal conductor 238 can be smaller than the surface integral in the x-y plane of the third conductor 133. Since some part of the base 120 is present between the third internal conductor 238 and the third conductor 133, the third internal conductor 238 is configured to be capacitively connected to the third conductor 133. The position of the third internal conductor 238 in the x-y plane can be appropriately adjusted according to the position of the third conductor 133 in the x-y plane.

The fourth internal conductor 239 faces the fourth conductor 134 in the z direction. The fourth internal conductor 239 is positioned away from the fourth conductor 134 in the z direction. In the x-y plane, the entire fourth internal conductor 239 can overlap with the fourth conductor 134. The surface integral in the x-y plane of the fourth internal conductor 239 can be smaller than the surface integral in the x-y plane of the fourth conductor 134. Since some part of the base 120 is present between the fourth internal conductor 239 and the fourth conductor 134, the fourth internal conductor 239 is configured to be capacitively connected to the fourth conductor 134. The position of the fourth internal conductor 239 in the x-y plane can be appropriately adjusted according to the position of the fourth conductor 134 in the x-y plane.

Each of the first internal conductor 236 to the fourth internal conductor 239 can have the shape of a flat plate. Each of the first internal conductor 236 to the fourth internal conductor 239 can be substantially square in shape. However, the first internal conductor 236 to the fourth internal conductor 239 are not limited to have a square shape. For example, the first internal conductor 236 to the fourth internal conductor 239 can be circular or elliptical in shape. The first internal conductor 236 to the fourth internal conductor 239 can all have either the same shape or different shapes.

The first branch portion 235*a* is configured to electrically connect the first internal conductor 236 and the third internal conductor 238. One end of the first branch portion 235*a* is configured to be electrically connected to one of the four corners of the first internal conductor 236. The other end of the first branch portion 235*a* is configured to be electrically connected to one of the four corners of the third internal conductor 238. The first branch portion 235*a* can extend along the direction connecting the first feeding line 151 and the third feeding line 153. The first branch portion 235*a* can extend along the y direction. The width of the first branch portion 235*a* in the x direction can be thin enough to be able to maintain the mechanical connection or the electrical connection between the first internal conductor 236 and the third internal conductor 238.

The second branch portion 235*b* is configured to electrically connect the second internal conductor 237 and the fourth internal conductor 239. One end of the second branch portion 235*b* is configured to be electrically connected to one of the four corners of the second internal conductor 237. The other end of the second branch portion 235*b* is configured to be electrically connected to one of the four corners of the fourth internal conductor 239. The second branch portion 235*b* can extend along the direction connecting the second feeding line 152 and the fourth feeding line 154. The second branch portion 235*b* can extend along the x direction. The width of the second branch portion 235*b* in the y direction can be thin enough to be able to maintain the mechanical connection or the electrical connection between the second internal conductor 237 and the fourth internal conductor 239.

The first branch portion 235*a* and the second branch portion 235*b* can intersect with each other in the vicinity of the center O1 of the radiation conductor 230. The first branch portion 235*a* and the second branch portion 235*b* can have some common part in the vicinity of the center O1. The width of the first branch portion 235*a* in the x direction can be either same as or different from the width of the second branch portion 235*b* in the y direction.

In the internal conductor 235, the capacitive coupling of the first internal conductor 236 to the fourth internal conductor 239 with the first conductor 131 to the fourth conductor 134, respectively, can be greater than the capacitive coupling of the first branch portion 235*a* and the second branch portion 235*b* with the first conductor 131 to the fourth conductor 134. In the capacitive coupling of the internal conductor 235 with the first conductor 131 to the fourth conductor 134, the capacitive coupling of the first internal conductor 236 to the fourth internal conductor 239 with the first conductor 131 to the fourth conductor 134, respectively, can be dominant.

For example, in the assembly process of the antenna 210, the positions of the first conductor 131 to the fourth conductor 134 in the x-y plane may be misaligned from the position of the internal conductor 235 in the x-y plane. Even if such misalignment occurs, there can be a decrease in the amount of misalignment of the first internal conductor 236 to the fourth internal conductor 239 with respect to the first conductor 131 to the fourth conductor 134, respectively. The decrease in that amount of misalignment enables achieving reduction in the probability that the capacitive coupling of the internal conductor 235 with the first conductor 131 to the fourth conductor 134 deviates from the design value. With such a configuration, in the antenna 210, the variability in the capacitive coupling of the internal conductor 235 with the first conductor 131 to the fourth conductor 134 can be reduced.

Figure 12:
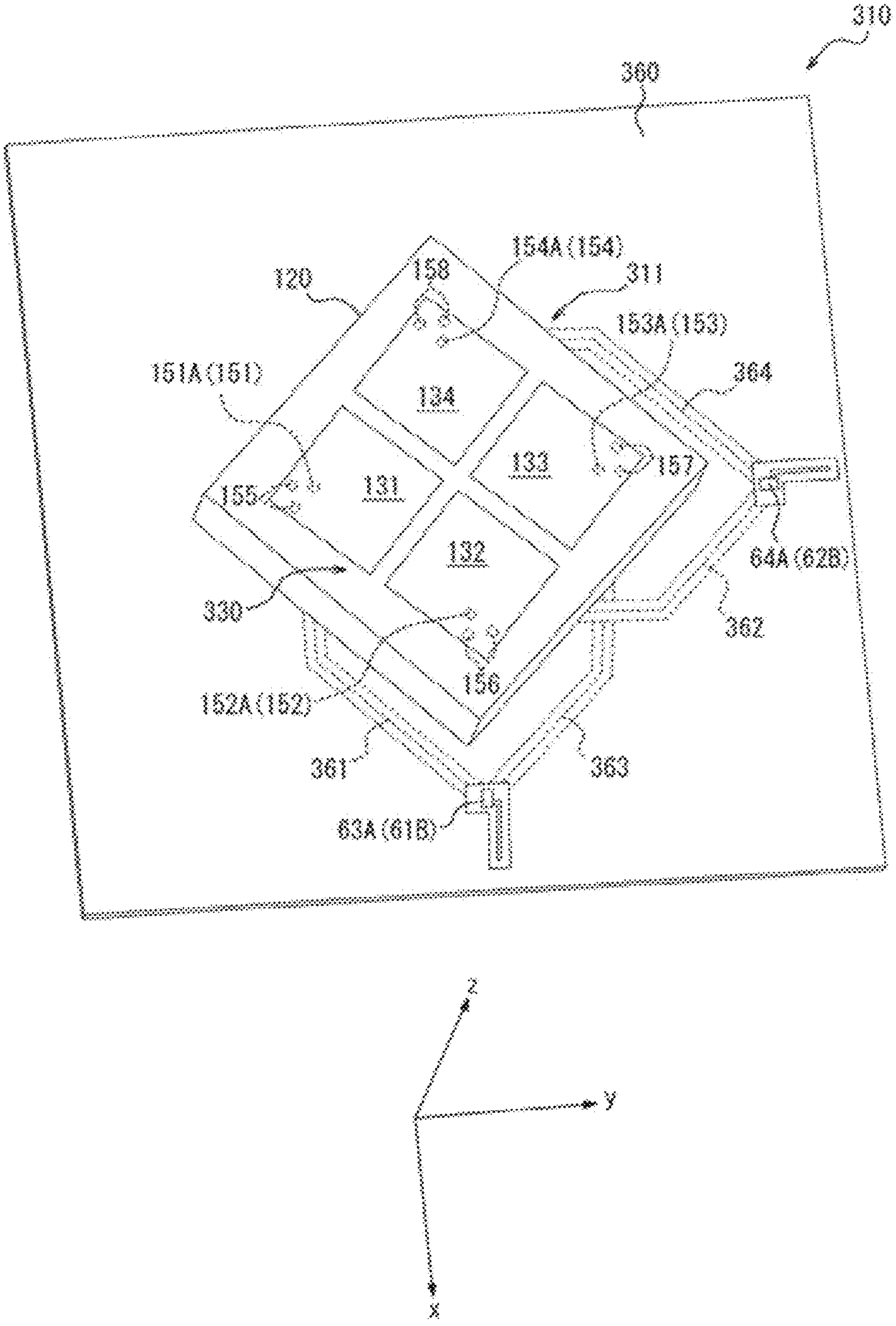
FIG. 12 is a perspective view of an antenna according to an embodiment.
Figure 13:
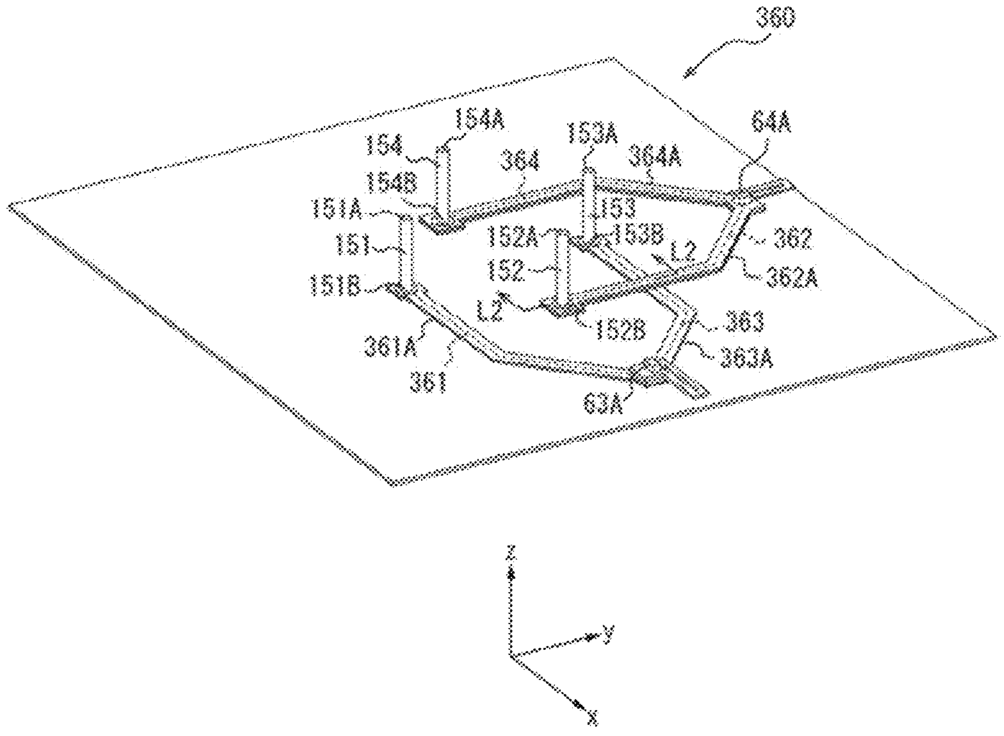
FIG. 13 is an exploded perspective view of a portion of a circuit board illustrated in FIG. 12.
Figure 14:
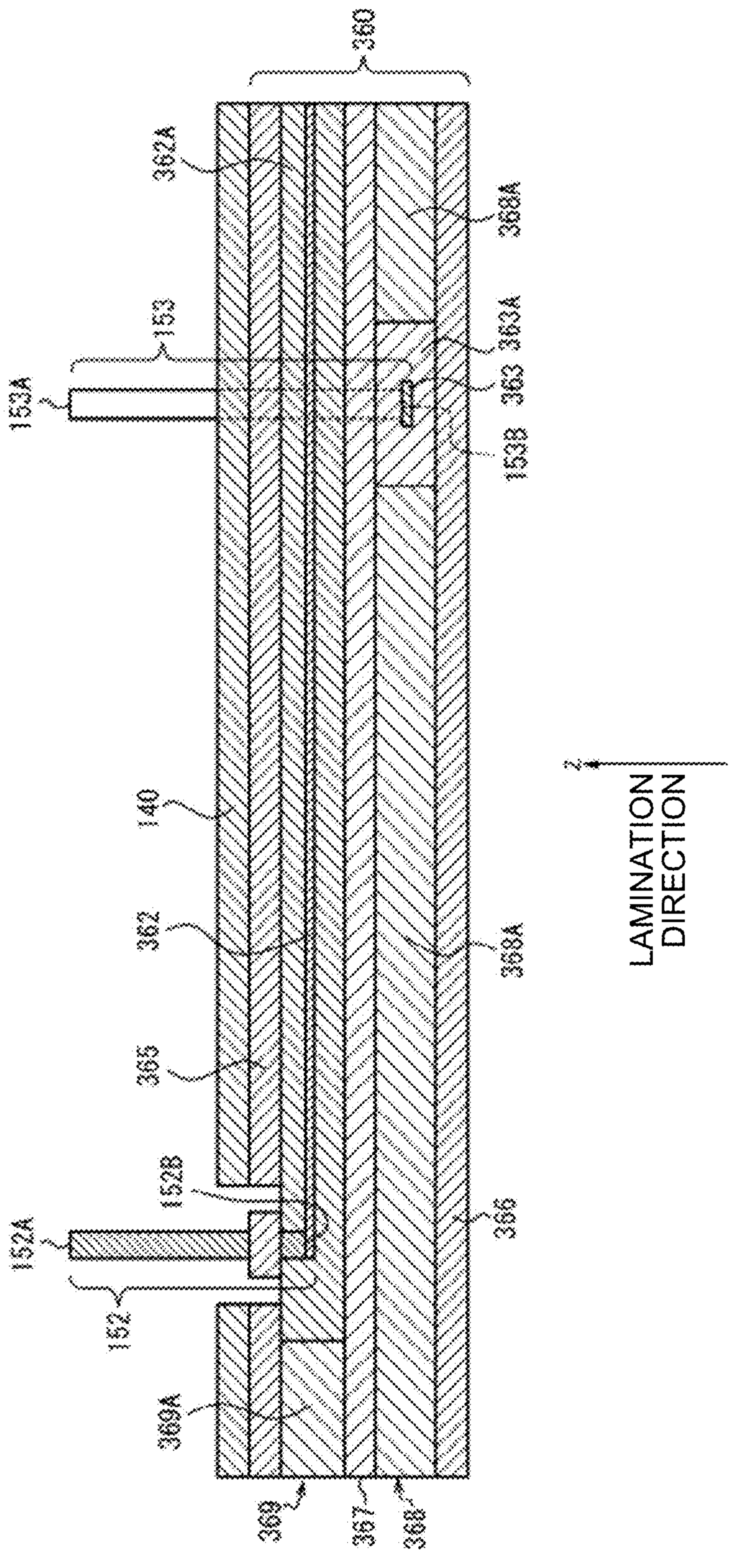
FIG. 14 is a cross-sectional view of the circuit board along L2-L2 line illustrated in FIG. 13.
Figure 15:
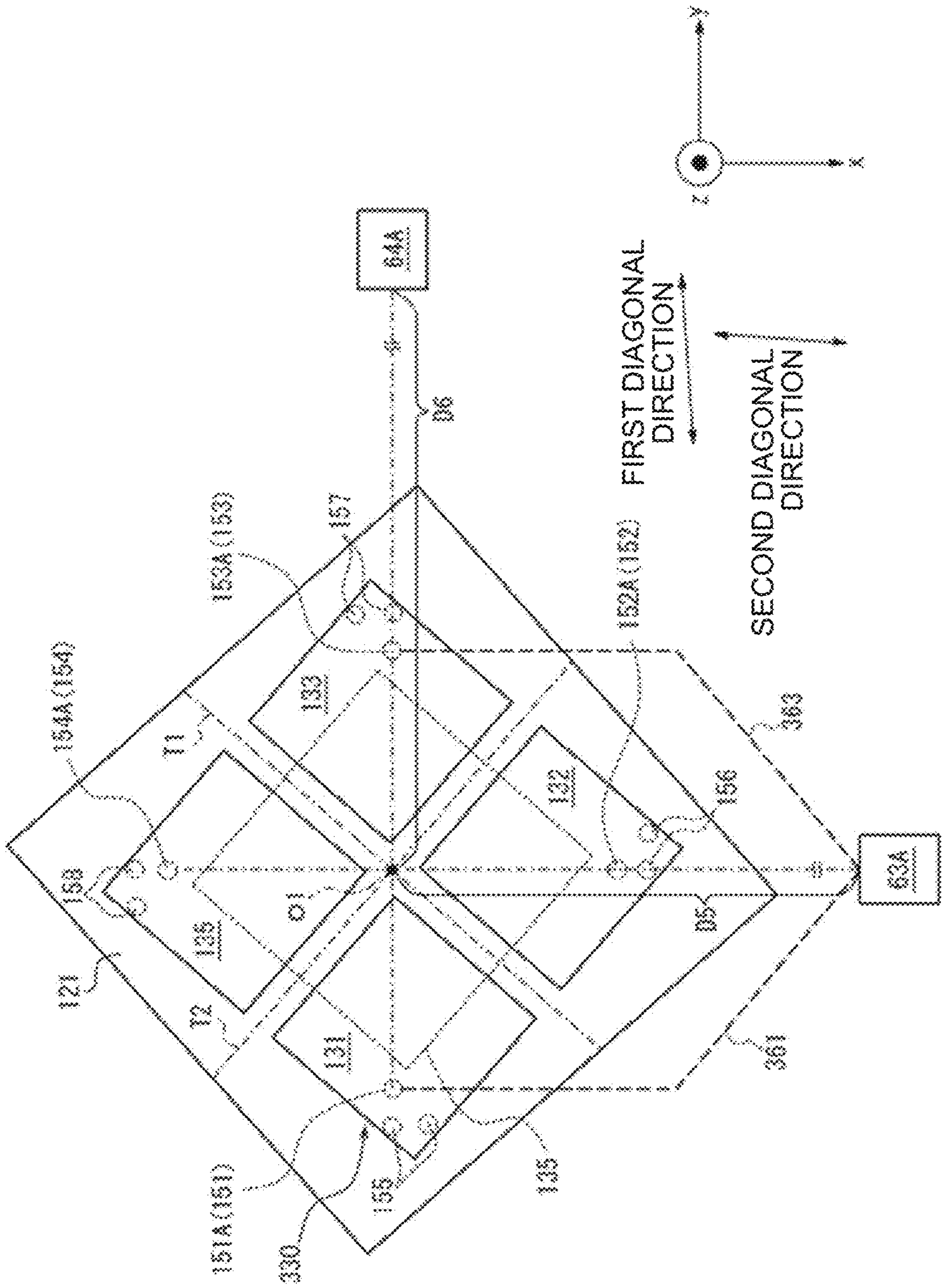
FIG. 15 is a planar view for explaining a configuration of a radiation conductor illustrated in FIG. 12.

FIG. 12 is a perspective view of an antenna 310 according to an embodiment. FIG. 13 is an exploded perspective view of a portion of a circuit board 360 illustrated in FIG. 12. FIG. 14 is a cross-sectional view of the circuit board 360 along L2-L2 line illustrated in FIG. 13. FIG. 15 is a planar view for explaining a configuration of a radiation conductor 330 illustrated in FIG. 12. The following explanation is given about the major differences between the antenna 310 illustrated in FIG. 12 and the antenna 110 illustrated in FIG. 5.

As illustrated in FIGS. 12 and 14, the antenna 310 includes the base 120, the radiation conductor 330, the ground conductor 140, and the first connecting conductor 155 to the fourth connecting conductor 158. As illustrated in FIG. 13, the antenna 310 includes the first feeding line 151, the second feeding line 152, the third feeding line 153, the fourth feeding line 154, and the circuit board 360 (a multilayer wiring substrate). The radiation conductor 330, the ground conductor 140, the first connecting conductor 155 to the fourth connecting conductor 158, and the feeding lines 150 are configured to function as an antenna element 311.

As illustrated in FIG. 12, the radiation conductor 330 includes the first conductor 131, the second conductor 132, the third conductor 133, and the fourth conductor 134. As illustrated in FIG. 15, the radiation conductor 330 includes the internal conductor 135. However, in place of including the internal conductor 135, the radiation conductor 330 can include the internal conductor 235 illustrated in FIG. 11.

As illustrated in FIG. 15, in the same manner as or in a similar manner to the configuration illustrated in FIG. 9, the first conductor 131 to the fourth conductor 134 are arranged in form of a square lattice on the top surface 121. However, in the configuration illustrated in FIG. 15, in the square lattice in which the first conductor 131 to the fourth conductor 134 are arranged, the first diagonal direction is inclined with respect to the y direction. As a result of being inclined with respect to the y direction, the first diagonal direction can be inclined with respect to the direction connecting the first feeding line 151 and the third feeding line 153, e.g., with respect to the y direction. Since the direction connecting the first feeding line 151 and the third feeding line 153 is inclined with respect to the first diagonal direction, the first feeding line 151 and the third feeding line 153 can excite the radiation conductor 330 in the x direction too. In the configuration illustrated in FIG. 15, in the square lattice in which the first conductor 131 to the fourth conductor 134 are arranged, the second diagonal direction is inclined with respect to the x direction. As a result of being inclined with respect to the x direction, the second diagonal direction can be inclined with respect to the direction connecting the second feeding line 152 and the fourth feeding line 154, e.g., with respect to the x direction. Since the direction connecting the second feeding line 152 and the fourth feeding line 154 is inclined with respect to the second diagonal direction, the second feeding line 152 and the fourth feeding line 154 can excite the radiation conductor 330 in the y direction too. The pair of the first feeding line 151 and the third feeding line 153 and the pair of the second feeding line 152 and the fourth feeding line 154 enable excitation of the radiation conductor 330 in two excitation directions. In the antenna 10, because of the excitation of the radiation conductor 30 in two excitation directions, the impedance component in each direction acts on the feeding lines 150. In the antenna 310, by cancelling out the impedance component in each direction, the impedance at the time of input can be reduced. As a result of a decrease in the impedance at the time of input, isolation in two polarization directions can be enhanced in the antenna 310. The angle of inclination of the first diagonal direction with respect to the y direction and the angle of inclination of the second diagonal direction with respect to the x direction can be appropriately adjusted by taking into account the desired gain of the antenna 310.

As illustrated in FIG. 15, of the two diagonal lines of the internal conductor 135 having a substantially square shape, one diagonal line can run along the first diagonal direction. Of the two diagonal lines of the internal conductor 135 having a substantially square shape, one diagonal line can be inclined with respect to the y direction in the same manner as or in a similar manner to the first diagonal direction. Of the two diagonal lines of the internal conductor 135 having a substantially square shape, the other diagonal line can run along the second diagonal direction. Of the two diagonal lines of the internal conductor 135 having a substantially square shape, the other diagonal line can be inclined with respect to the x direction in the same manner as or in a similar manner to the second diagonal direction.

As illustrated in FIG. 14, the circuit board 360 has a structure in which the layers are laminated along the z direction. The lamination direction of the circuit board 360 can correspond to the z direction. Among the layers of the circuit board 360, the layer positioned on the opposite side of the antenna 310 is called the bottom layer. Among the layers of the circuit board 360, the layer positioned on the side of the antenna 310 is called the top layer.

As illustrated in FIG. 12, the circuit board 360 includes a first feeding circuit 61B and a second feeding circuit 62B. The first feeding circuit 61B includes a first inverting circuit 63A. The second feeding circuit 62B includes a second inverting circuit 64A. The first inverting circuit 63A and the second inverting circuit 64A are baluns. As illustrated in FIG. 15, the first inverting circuit 63A can be positioned away from the center O1 of the radiation conductor 330 along the x direction. The distance from the center O1 of the radiation conductor 330 to the first inverting circuit 63A is referred to as a distance D5. The second inverting circuit 64A can be positioned away from the center O1 of the radiation conductor 330 along the y direction. The distance from the center O1 of the radiation conductor 330 to the second inverting circuit 64A is referred to as a distance D6. As described later, the distance D5 can be different from the distance D6.

As illustrated in FIG. 13, the circuit board 360 includes a first wiring pattern 361 and a dielectric layer 361A; a second wiring pattern 362 and a dielectric layer 362A; a third wiring pattern 363 and a dielectric layer 363A; and a fourth wiring pattern 364 and a dielectric layer 364A. As illustrated in FIG. 14, the circuit board 360 includes a ground conductor layer 365, conductor layers 366 and 367, a first layer 368, and a second layer 369.

The first wiring pattern 361 to the fourth wiring pattern 364 can be same as the first wiring 161 to the fourth wiring 164, respectively, illustrated in FIG. 8. The first wiring pattern 361 is configured to electrically connect the first inverting circuit 63A and the first feeding line 151. The second wiring pattern 362 is configured to electrically connect the second inverting circuit 64A and the second feeding line 152. The third wiring pattern 363 is configured to electrically connect the first inverting circuit 63A and the third feeding line 153. The fourth wiring pattern 364 is configured to electrically connect the second inverting circuit 64A and the fourth feeding line 154. The points at which the first feeding line 151 to the fourth feeding line 154 are connected to the first wiring pattern 361 to the fourth wiring pattern 364, respectively, are referred to as connecting points 151B, 152B, 153B, and 154B, respectively.

The first wiring pattern 361 and the third wiring pattern 363 are positioned in the first layer 368 illustrated in FIG. 14. Within the first layer 368, the first wiring pattern 361 and the third wiring pattern 363 can extend along the x-y plane. As illustrated in FIG. 15, the first wiring pattern 361 and the third wiring pattern 363 can be axisymmetric with respect to the symmetrical axis along the direction connecting the center O1 of the radiation conductor 330 and the first inverting circuit 63A. Because of the axisymmetric nature of the first wiring pattern 361 and the third wiring pattern 363, the width and the wiring length of the first wiring pattern 361 can be equal to the width and the wiring length of the third wiring pattern 363. The wiring lengths of the first wiring pattern 361 and the third wiring pattern 363 can increase and decrease in proportion to the distance D5 illustrated in FIG. 15.

The second wiring pattern 362 and the fourth wiring pattern 364 are positioned in the second layer 369 illustrated in FIG. 14. Within the second layer 369, the second wiring pattern 362 and the fourth wiring pattern 364 can extend along the x-y plane. As illustrated in FIG. 15, the second wiring pattern 362 and the fourth wiring pattern 364 can be axisymmetric with respect to the symmetrical axis along the direction connecting the center O1 of the radiation conductor 330 and the second inverting circuit 64A. Because of the axisymmetric nature of the second wiring pattern 362 and the fourth wiring pattern 364, the width and the wiring length of the second wiring pattern 362 can be equal to the width and the wiring length of the fourth wiring pattern 364. The wiring lengths of the second wiring pattern 362 and the fourth wiring pattern 364 can increase and decrease in proportion to the distance D6 illustrated in FIG. 15.

The wiring lengths of the first wiring pattern 361 and the third wiring pattern 363 either can be substantially equal to or can be different from the wiring lengths of the second wiring pattern 362 and the fourth wiring pattern 364. If the distances D5 and D6 illustrated in FIG. 15 are different, then the wiring lengths of the first wiring pattern 361 and the third wiring pattern 363 can be different from the wiring lengths of the second wiring pattern 362 and the fourth wiring pattern 364. In the present embodiment, by appropriately adjusting the distances D5 and D6, the relationship of the wiring lengths of the first wiring pattern 361 and the third wiring pattern 363 with the wiring lengths of the second wiring pattern 362 and the fourth wiring pattern 364 can be adjusted.

The dielectric layers 361A to 364A are made of an arbitrary electroconductive material. The dielectric layers 361A to 364A surround the first wiring pattern 361 to the fourth wiring pattern 364, respectively. The dielectric layers 361A to 364A can have the shapes dependent on the shapes of the first wiring pattern 361 to the fourth wiring pattern 364, respectively. In the same manner as or in a similar manner to the first wiring pattern 361 and the third wiring pattern 363, the dielectric layers 361A and 363A are positioned in the first layer 368. In the same manner as or in a similar manner to the second wiring pattern 362 and the fourth wiring pattern 364, the dielectric layers 362A and 364A are positioned in the second layer 369.

The ground conductor layer 365 can be made of the same or similar material as the ground conductor 165 illustrated in FIG. 6. The ground conductor layer 365 can extend along the x-y plane. The ground conductor layer 365 can be the topmost layer of the circuit board 360. The ground conductor layer 365 faces the ground conductor 140 of the antenna 310. The ground conductor layer 365 can be integrated with the ground conductor 140 of the antenna 310.

The conductor layers 366 and 367 can be made of the same or similar material as the ground conductor 165 illustrated in FIG. 6. The conductor layer 366 is the lower layer of the first layer 368. The conductor layer 367 is positioned between the first layer 368 and the second layer 369. The conductor layers 366 and 367 can extend along the x-y plane. The conductor layers 366 and 367 can be configured to be electrically connected to the ground conductor layer 365 through via holes.

The conductor layers 366 and 367 are configured to shield the first wiring pattern 361 and the third wiring pattern 363 in the z direction. The conductor layer 367 and the ground conductor layer 365 are configured to shield the second wiring pattern 362 and the fourth wiring pattern 364 in the z direction.

The first layer 368 is a lower layer than the second layer 369. In the lamination direction of the circuit board 360, for example, in the z direction; the first layer 368 is positioned farther from the radiation conductor 330 than the second layer 369.

The first layer 368 includes the first wiring pattern 361 and the dielectric layer 361A; the third wiring pattern 363 and the dielectric layer 363A; and a conductor layer 368A. The conductor layer 368A can be made of the same or similar material as the ground conductor 165 illustrated in FIG. 6. The conductor layer 368A can be configured to be electrically connected, using via holes, to the conductor layer 366, which is the bottom layer of the first layer 368, and to the conductor layer 367, which is the top layer of the first layer 368. In the first layer 368, the conductor layer 368A can be configured to fill the places excluding the dielectric layers 361A and 363A. The conductor layer 368A is configured to shield the first wiring pattern 361 and the third wiring pattern 363 in the x and y directions.

The second layer 369 includes the second wiring pattern 362 and the dielectric layer 362A; the fourth wiring pattern 364 and the dielectric layer 364A; and a conductor layer 369A. The conductor layer 369A can be made of the same or similar material as the ground conductor 165 illustrated in FIG. 6. The conductor layer 369A can be configured to be electrically connected, using via holes, to the ground conductor layer 365, which is the top layer of the second layer 369, and to the conductor layer 367, which is the bottom layer of the second layer 369. In the second layer 369, the conductor layer 369A can be configured to fill the places excluding the dielectric layers 362A and 364A. The conductor layer 369A is configured to shield the second wiring pattern 362 and the fourth wiring pattern 364 in the x and y directions.

As illustrated in FIG. 13, the first feeding line 151 and the third feeding line 153 are configured to be electrically connected to the first wiring pattern 361 and the third wiring pattern 363, respectively. As explained earlier, the first wiring pattern 361 and the third wiring pattern 363 are positioned in the same first layer 368. Since the first wiring pattern 361 and the third wiring pattern 363 are positioned in the same first layer 368, the positions of the connecting points 151B and 153B in the z direction can be substantial same. Because of the substantially same positions of the connecting points 151B and 153B in the z direction, the positions of the feeding points 151A and 153A in the z direction can be substantially equal. Consequently, the length of the first feeding line 151 in the z direction can be substantially equal to the length of the third feeding line 153 in the z direction.

As illustrated in FIG. 13, the second feeding line 152 and the fourth feeding line 154 are configured to be electrically connected to the second wiring pattern 362 and the fourth wiring pattern 364, respectively. As explained earlier, the second wiring pattern 362 and the fourth wiring pattern 364 are positioned in the same second layer 369. Since the second wiring pattern 362 and the fourth wiring pattern 364 are positioned in the same second layer 369, the positions of the connecting points 152B and 154B in the z direction can be substantial same. Because of the substantially same positions of the connecting points 152B and 154B in the z direction, the positions of the feeding points 152A and 154A in the z direction can be substantially equal. Consequently, the length of the second feeding line 152 in the z direction can be substantially equal to the length of the fourth feeding line 154 in the z direction.

As explained above, the first layer 368 is a lower layer than the second layer 369. Because the first layer 368 is a lower layer than the second layer 369, the connecting points 151B and 153B positioned on the first layer 368 are positioned more on the side of the negative direction of the z axis than the connecting points 152B and 154B positioned on the second layer 369. As illustrated in FIG. 13, the positions of the feeding points 151A, 152A, 153A, and 154A in the z direction can be substantially same. Hence, the lengths of the first feeding line 151 and the third feeding line 153 in the z direction can be longer than the lengths of the second feeding line 152 and the fourth feeding line 154 in the z direction. The resistance values of the first feeding line 151 and the third feeding line 153 can be higher than the resistance values of the second feeding line 152 and the fourth feeding line 154.

When the resistance values of the first feeding line 151 and the third feeding line 153 are higher than the resistance values of the second feeding line 152 and the fourth feeding line 154, the distance D6 can be greater than the distance D5 as illustrated in FIG. 15. Since the distance D6 is greater than the distance D5, the wiring lengths of the second wiring pattern 362 and the fourth wiring pattern 364 can be greater than the wiring lengths of the first wiring pattern 361 and the third wiring pattern 363. The resistance values of the second wiring pattern 362 and the fourth wiring pattern 364 can be greater than the resistance values of the first wiring pattern 361 and the third wiring pattern 363. With such a configuration, the resistance value from the first inverting circuit 63A to each of the feeding points 151A and 153A can be substantially equal to the resistance value from the second inverting circuit 64A to each of the feeding points 152A and 154A. However, the characteristics of the baluns of the first inverting circuit 63A and the second inverting circuit 64A may vary within the acceptable error range. In that case, the phase difference between two electrical signals output from the first inverting circuit 63A as well as the phase difference between two electrical signals output from the second inverting circuit 64A may shift from 180°. If the phase difference of such two electrical signals has shifted from 180°, then the degree of interference among the first wiring pattern 361 to the fourth wiring pattern 364 may change as compared to the case in which the phase difference of such two electrical signals has not shifted from 180°. In that case, the distances D5 and D6 can be appropriately adjusted by taking into account the desired gain of the antenna 310 in the desired frequency band.

Depending on the phase difference between two electrical signals output from the first inverting circuit 63A, the direction connecting the center O1 of the radiation direction 330 and the first inverting circuit 63A can be inclined with respect to the x direction. For example, the direction connecting the center O1 of the radiation direction 330 and the first inverting circuit 63A can be ensured to be inclined with respect to the x direction in such a way that the electrical signals at the feeding point 151A have the phase difference of 180° with respect to the electrical signals at the feeding point 153A.

Depending on the phase difference between two electrical signals output from the second inverting circuit 64A, the direction connecting the center O1 of the radiation direction 330 and the second inverting circuit 64A can be inclined with respect to the y direction. For example, the direction connecting the center O1 of the radiation direction 330 and the second inverting circuit 64A can be ensured to be inclined with respect to the y direction in such a way that the electrical signals at the feeding point 152A have the phase difference of 180° with respect to the electrical signals at the feeding point 154A.

Figure 16:
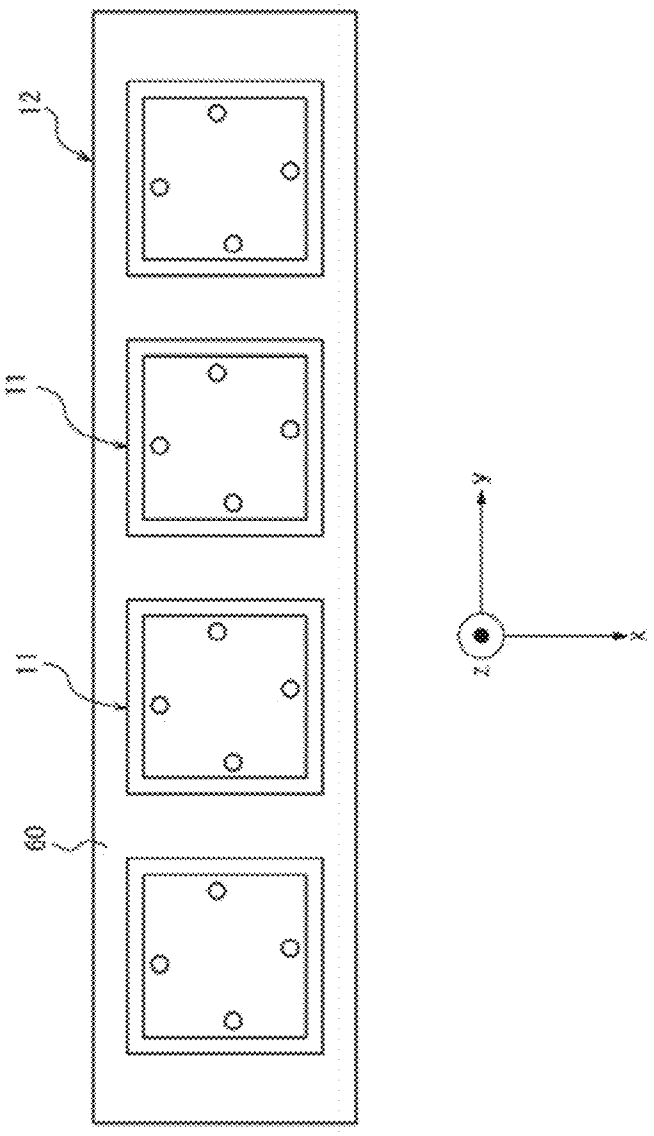
FIG. 16 is a planar diagram illustrating an array antenna according to an embodiment.

FIG. 16 is a planar diagram illustrating an array antenna 12 according to an embodiment. The array antenna 12 includes a plurality of antenna elements 11. However, instead of including the antenna elements 11, the array antenna 12 can include the antenna elements 111 illustrated in FIG. 5, or the antenna elements 211 illustrated in FIG. 10, or the antenna elements 311 illustrated in FIG. 12. The antenna elements 11 can be lined along the y direction. The antenna elements 11 can be arranged in the y direction. The antenna elements 11 can be lined along the x direction. The antenna elements 11 can be arranged in the x direction. The array antenna 12 includes at least one circuit board 60. The circuit board 60 includes at least one first feeding circuit 61 and at least one second feeding circuit 62. The array antenna 12 includes at least one first feeding circuit 61 and at least one second feeding circuit 62.

The first feeding circuit 61 can be configured to be connected to one or more antenna elements 11. At the time of feeding power to a plurality of antenna elements 11, the first feeding circuit 61 can be configured to supply the same signal to all antenna elements 11. At the time of feeding power to a plurality of antenna elements 11, the first feeding circuit 61 can be configured to supply the same signal to the first feeding line 51 of each antenna element 11. At the time of feeding power to a plurality of antenna elements 11, the first feeding circuit 61 can be configured to supply a signal having a different phase to the first feeding line 51 of each antenna element 11. At the time of feeding power to a plurality of antenna elements 11, the first feeding circuit 61 can be configured to supply the same signal to the third feeding line 53 of each antenna element 11. At the time of feeding power to a plurality of antenna elements 11, the first feeding circuit 61 can be configured to supply a signal having a different phase to the third feeding line 53 of each antenna element 11.

The second feeding circuit 62 can be configured to be connected to one or more antenna elements 11. At the time of feeding power to a plurality of antenna elements 11, the second feeding circuit 62 can be configured to supply the same signal to all antenna elements 11. At the time of feeding power to a plurality of antenna elements 11, the second feeding circuit 62 can be configured to supply the same signal to the second feeding line 52 of each antenna element 11. At the time of feeding power to a plurality of antenna elements 11, the second feeding circuit 62 can be configured to supply a signal having a different phase to the second feeding line 52 of each antenna element 11. At the time of feeding power to a plurality of antenna elements 11, the second feeding circuit 62 can be configured to supply the same signal to the fourth feeding line 54 of each antenna element 11. At the time of feeding power to a plurality of antenna elements 11, the second feeding circuit 62 can be configured to supply a signal having a different phase to the fourth feeding line 54 of each antenna element 11.

Figure 17:
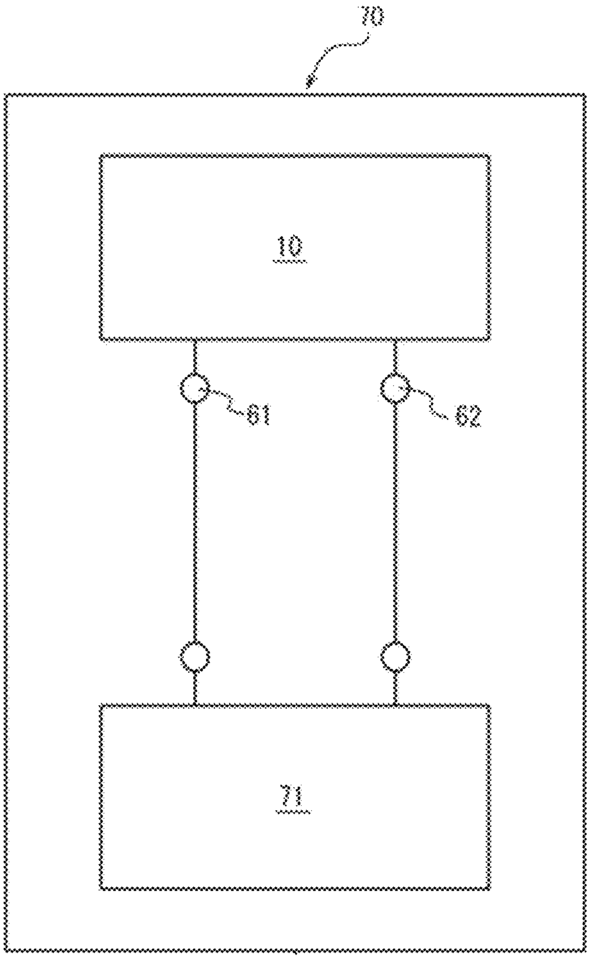
FIG. 17 is a planar view of a radio communication module according to an embodiment.

FIG. 17 is a planar view of a radio communication module 70 according to an embodiment. The radio communication module 70 includes a driving circuit 71, which is configured to drive the antenna element 11. Alternatively, the driving circuit 71 can be configured to drive the antenna element 111 illustrated in FIG. 5, or to drive the antenna element 211 illustrated in FIG. 10, or to drive the antenna element 311 illustrated in FIG. 12. The driving circuit 71 is configured to be connected, directly or indirectly, to the first feeding circuit 61 and the second feeding circuit 62. The driving circuit 71 can be configured to feed transmission signals to at least one of the first feeding circuit 61 and the second feeding circuit 62. The driving circuit 71 can be configured to receive the feed of reception signals from at least one of the first feeding circuit 61 and the second feeding circuit 62.

Figure 18:
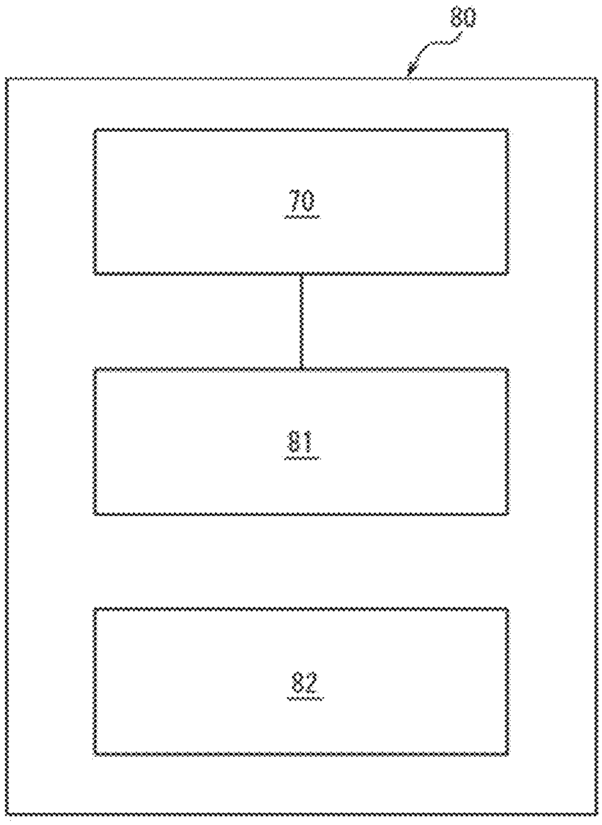
FIG. 18 is a planar view of a radio communication device according to an embodiment.

FIG. 18 is a planar view of a radio communication device 80 according to an embodiment. The radio communication device 80 can include the radio communication module 70, a sensor 81, and a battery 82. The sensor 81 performs sensing operations. The battery 82 is configured to supply electric power to the parts of the radio communication device 80. The driving circuit 71 can be configured to perform driving when supplied with electrical power from the battery 82.

Figure 19:
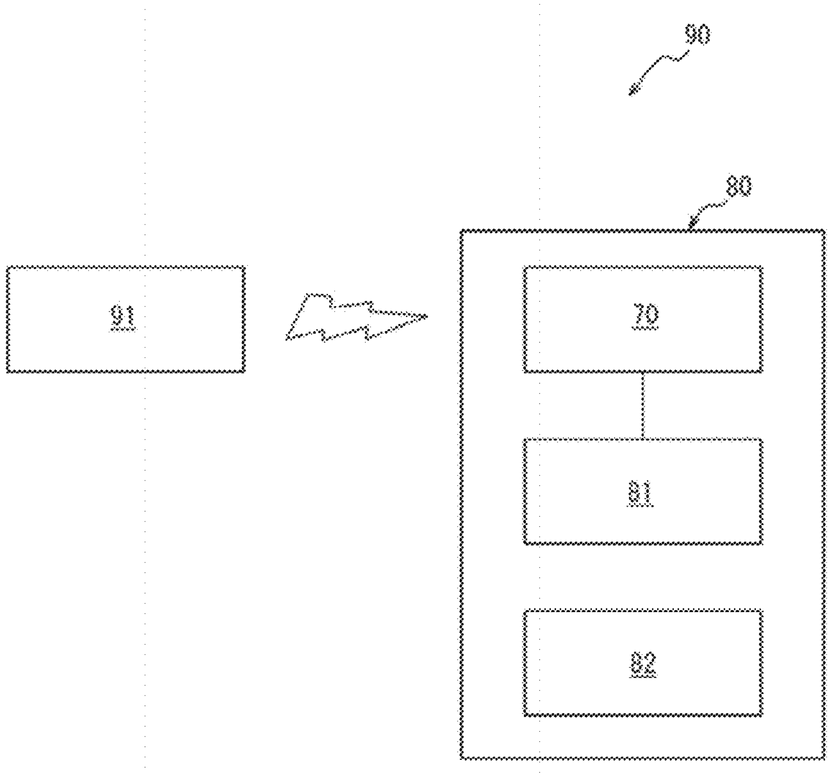
FIG. 19 is a planar view of a radio communication system according to an embodiment.

FIG. 19 is a planar view of a radio communication system 90 according to an embodiment. The radio communication system 90 includes the radio communication device 80 and a second radio communication device 91. The second radio communication device 91 is configured to perform radio communication with the radio communication device 80.

In this way, according to the present disclosure, the antenna 10, 110, 210, 310; the array antenna 12; the radio communication module 70; and the radio communication device 80 of a new type can be provided.

The configuration according to the present disclosure is not limited to embodiments described above, and it is possible to have a number of modifications and variations. For example, the functions included in the constituent elements can be rearranged without causing any logical contradiction. Thus, a plurality of constituent elements can be combined into a single constituent elements, or constituent elements can be divided.

The drawings used for explaining the configurations according to the present disclosure are schematic in nature. That is, the dimensions and the proportions in the drawings do not necessarily match with the actual dimensions and proportions.

According to the embodiment as illustrated in FIG. 1, a patch-type antenna is used as the antenna element 11. However, the antenna element 11 is not limited to a patch-type antenna. Some other type of antenna can be used as the antenna element 11.

According to the embodiment as illustrated in FIG. 16, in the array antenna 12, a plurality of antenna elements 11 can be lined with the same orientation. In the array antenna 12, two neighboring antenna elements 11 can have different orientations. When two neighboring antenna elements 11 have different orientations, the antenna element 11 is excited in one direction.

In the present disclosure, the terms “first”, “second”, “third”, and so on are examples of identifiers meant to distinguish the configurations from each other. In the present disclosure, regarding the configurations distinguished by the terms “first” and “second”, the respective identifying numbers can be reciprocally exchanged. For example, regarding a first frequency and a second frequency, the identifiers “first” and “second” can be reciprocally exchanged. The exchange of identifiers is performed in a simultaneous manner. Even after the identifiers are exchanged, the configurations remain distinguished from each other. Identifiers can be removed too. The configurations from which the identifiers are removed are still distinguishable by the reference numerals. For example, the first feeding line 51 can be referred to as the feeding line 51. In the present disclosure, the terms “first”, “second”, and so on of the identifiers should not be used in the interpretation of the ranking of the configurations, or should not be used as the basis for having identifiers with low numbers, or should not be used as the basis for having identifiers with high numbers. In the present disclosure, a configuration in which the circuit board 60 includes the second feeding circuit 62 but does not include the first feeding circuit 61 is included.

The invention claimed is:

1. An antenna comprising:

a radiation conductor;

a ground conductor;

a first feeding line that is configured to be electromagnetically connected to the radiation conductor;

a second feeding line that is configured to be electromagnetically connected to the radiation conductor;

a third feeding line that is configured to be electromagnetically connected to the radiation conductor;

a fourth feeding line that is configured to be electromagnetically connected to the radiation conductor;

a first feeding circuit that is configured to feed reversed-phased signals, which have mutually opposite phases, to the first feeding line and the third feeding line; and a second feeding circuit that is configured to feed reversed-phased signals, which have mutually opposite phases, to the second feeding line and the fourth feeding line, wherein the radiation conductor is configured to be excited in a first direction due to feed from the first feeding line and the third feeding line, the radiation conductor is configured to be excited in a second direction due to feed from the second feeding line and the fourth feeding line, when seen from a center of the radiation conductor, the third feeding line is positioned on opposite side of the first feeding line in the first direction, and when seen from a center of the radiation conductor, the fourth feeding line is positioned on opposite side of the second feeding line in the second direction.

2. The antenna according to claim 1, wherein a direction connecting the first feeding line and the third feeding line is inclined with respect to the first direction, and direction connecting the second feeding line and the fourth feeding line is inclined with respect to the second direction.

3. The antenna according to claim 1, wherein the radiation conductor includes a first conductor, a second conductor, a third conductor, and a fourth conductor, the antenna further comprises a first connecting conductor that is configured to electrically connect the first conductor and the ground conductor, a second connecting conductor that is configured to electrically connect the second conductor and the ground conductor, a third connecting conductor that is configured to electrically connect the third conductor and the ground conductor, and a fourth connecting conductor that is configured to electrically connect the fourth conductor and the ground conductor, the first feeding line is configured to be electromagnetically connected to the first conductor, the second feeding line is configured to be electromagnetically connected to the second conductor, the third feeding line is configured to be electromagnetically connected to the third conductor, and the fourth feeding line is configured to be electromagnetically connected to the fourth conductor.

4. The antenna according to claim 3, wherein the radiation conductor further includes an internal conductor, in a third direction that intersects with a first plane which includes the first direction and the second direction, the internal conductor is positioned away from the first conductor, the second conductor, the third conductor, and the fourth conductor, and the internal conductor is configured to capacitively connect the first conductor, the second conductor, the third conductor, and the fourth conductor.

5. The antenna according to claim 4, wherein the internal conductor includes a first internal conductor that faces the first conductor in the third direction, a second internal conductor that faces the second conductor in the third direction, a third internal conductor that faces the third conductor in the third direction, a fourth internal conductor that faces the fourth conductor in the third direction, a first branch portion that is configured to electrically connect the first internal conductor and the third internal conductor, and a second branch portion that is configured to electrically connect the second internal conductor and the fourth internal conductor.

6. The antenna according to claim 3, wherein the first conductor, the second conductor, the third conductor, and the fourth conductor are arranged in a form of a square lattice, the first conductor and the third conductor are arranged in the first diagonal direction of the square lattice, the second conductor and the fourth conductor are arranged in the second diagonal direction of the square lattice, the first diagonal direction is inclined with respect to the first direction, and the second diagonal direction is inclined with respect to the second direction.

7. The antenna according to claim 1, wherein the first feeding circuit includes a first inverting circuit that includes a balun, first wiring that is configured to electrically connect the first inverting circuit and the first feeding line, and third wiring that is configured to electrically connect the first inverting circuit and the third feeding line, the first feeding circuit is configured to feed, from the first wiring and the third wiring to the first feeding line and the third feeding line, reversed-phased signals having phases inverted in a resonance frequency band, the second feeding circuit includes a second inverting circuit that includes a balun, second wiring that is configured to electrically connect the second inverting circuit and second first feeding line, and fourth wiring that is configured to electrically connect the second inverting circuit and the fourth feeding line, and the second feeding circuit is configured to feed, from the second wiring and the fourth wiring to the second feeding line and the fourth feeding line, reversed-phased signals having phases inverted in the resonance frequency band.

8. The antenna according to claim 7, further comprising a multi-layer wiring substrate, wherein the multi-layer wiring substrate includes the first wiring as a first wiring pattern, the second wiring as a second wiring pattern, the third wiring as a third wiring pattern, the fourth wiring as a fourth wiring pattern, the first wiring pattern and the third wiring pattern are positioned in a first layer of the multi-layer wiring substrate, and are axisymmetric with respect to a symmetrical axis along a direction connecting the center of the radiation conductor and the first inverting circuit, the second wiring pattern and the fourth wiring pattern are positioned in a second layer of the multi-layer wiring substrate that is different from the first layer, and are axisymmetric with respect to a symmetrical axis along a direction connecting the center of the radiation conductor and the second inverting circuit, and a distance between the center of the radiation conductor and the first inverting circuit is different from a distance between the center of the radiation conductor and the second inverting circuit.

9. The antenna according to claim 8, wherein in a lamination direction of the multi-layer wiring substrate, the first layer is positioned farther from the radiation conductor than the second layer, the first inverting circuit is positioned away from the center of the radiation conductor in the second direction, the second inverting circuit is positioned away from the center of the radiation conductor in the first direction, and a distance between the center of the radiation conductor and the second inverting circuit in the first direction is longer than a distance between the center of the radiation conductor and the first inverting circuit in the second direction.

10. The antenna according to claim 1, wherein at least one of the first feeding circuit and the second feeding circuit includes an inverting circuit that inverts phase in a resonance frequency band.

11. The antenna according to claim 10, wherein the inverting circuit is either a balun or a delay line.

12. The antenna according to claim 10, wherein the second inverting circuit is either a balun or a delay line.

13. The antenna according to claim 1, wherein the first feeding circuit includes an inductance element that is connected to the first feeding line, and a capacitance element that is connected to the third feeding line, and the second feeding circuit includes an inductance element that is connected to the second feeding line, and a capacitance element that is connected to the fourth feeding line.

14. The antenna according to claim 1, wherein the antenna is configured to resonate with a node in vicinity of the center of the radiation conductor.

15. The antenna according to claim 1, wherein the first feeding line and the second feeding line are symmetric across a first symmetrical axis passing through the center of the radiation conductor, and the third feeding line and the fourth feeding line are symmetric across the first symmetrical axis.

16. The antenna according to claim 1, wherein the first feeding line and the fourth feeding line are symmetric across a second symmetrical axis passing through the center of the radiation conductor, and the second feeding line and the third feeding line are symmetric across the second symmetrical axis.

17. The antenna according to claim 1, wherein the radiation conductor is half the size of an operating wavelength.

18. An array antenna comprising a plurality of antenna elements, each representing the antenna according to claim 1, wherein the plurality of antenna elements are arranged in at least one of the first direction and the second direction.

19. A radio communication module comprising:

one or a plurality of antenna elements, each representing the antenna according to claim 1; and a driving circuit that is configured to be connected, directly or indirectly, to the first feeding circuit and the second feeding circuit.

20. A radio communication device comprising:

the radio communication module according to claim 19; and a battery that is configured to drive the driving circuit.

* * * * *